Sept. 3, 1963 D. CLEJAN 3,102,646
METHODS OF LOADING AND OF UNLOADING FREIGHT CONTAINERS
IN FREIGHT TRANSPORTATION SYSTEMS
Filed Nov. 9, 1961 15 Sheets-Sheet 2
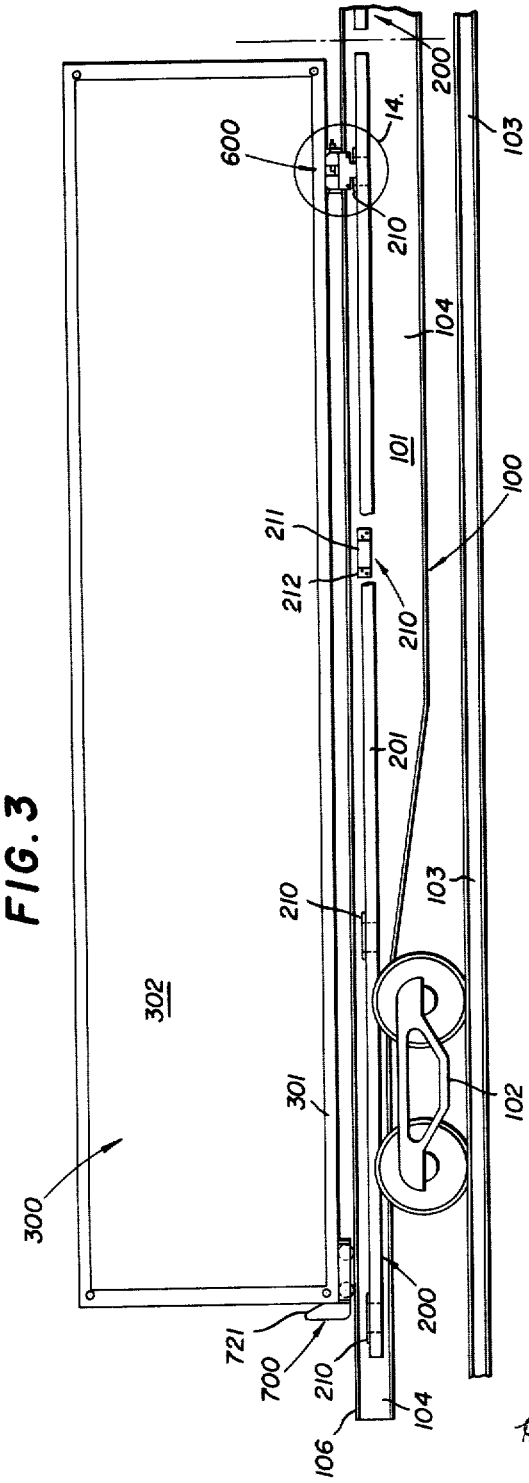
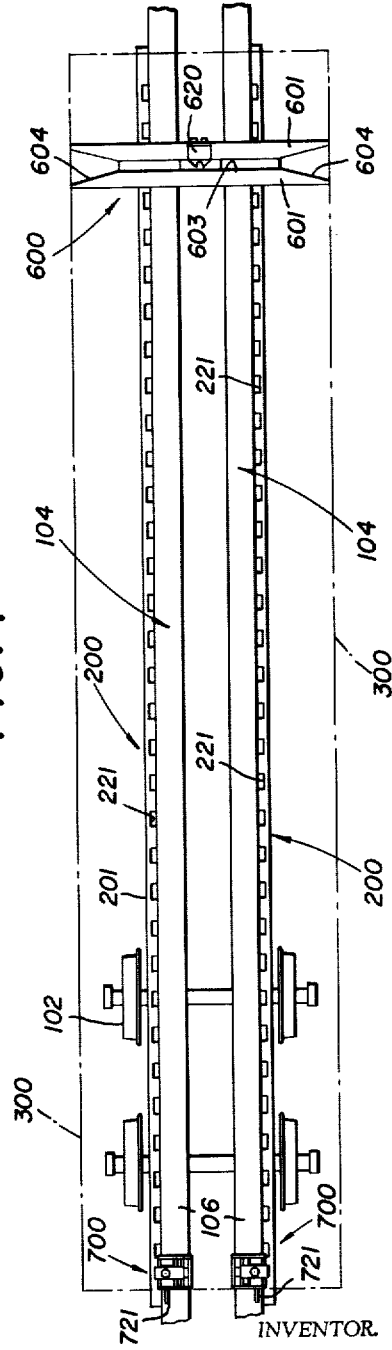
INVENTOR.
DEODAT CLEJAN
BY
Brangley, Baird, Clayton, Miller & Vogel
ATTYS.

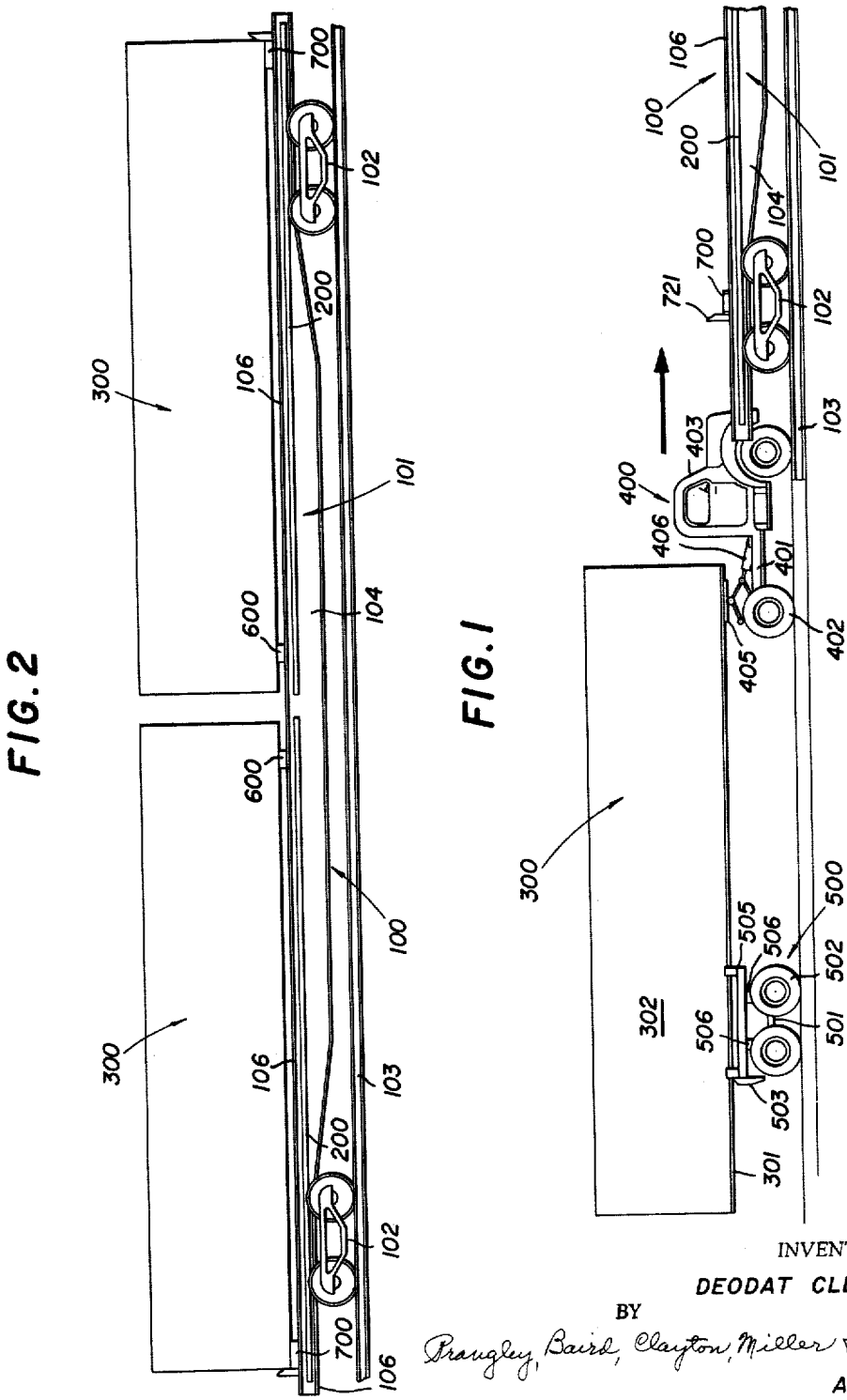

Sept. 3, 1963 D. CLEJAN 3,102,646
METHODS OF LOADING AND OF UNLOADING FREIGHT CONTAINERS
IN FREIGHT TRANSPORTATION SYSTEMS
Filed Nov. 9, 1961 15 Sheets-Sheet 3

INVENTOR.
DEODAT CLEJAN
BY
Brumby, Baird, Clayton, Miller & Vogel
ATTYS.

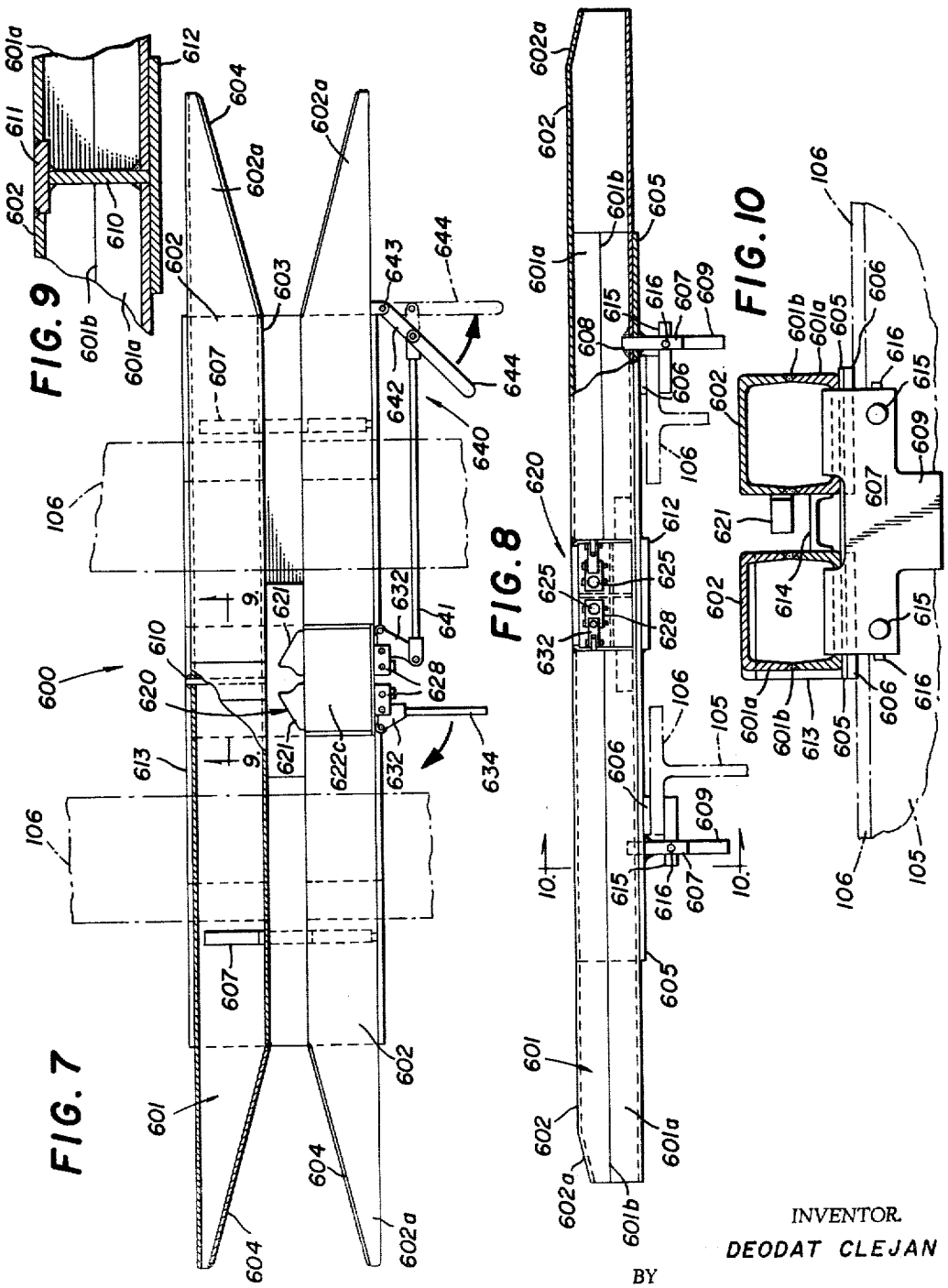

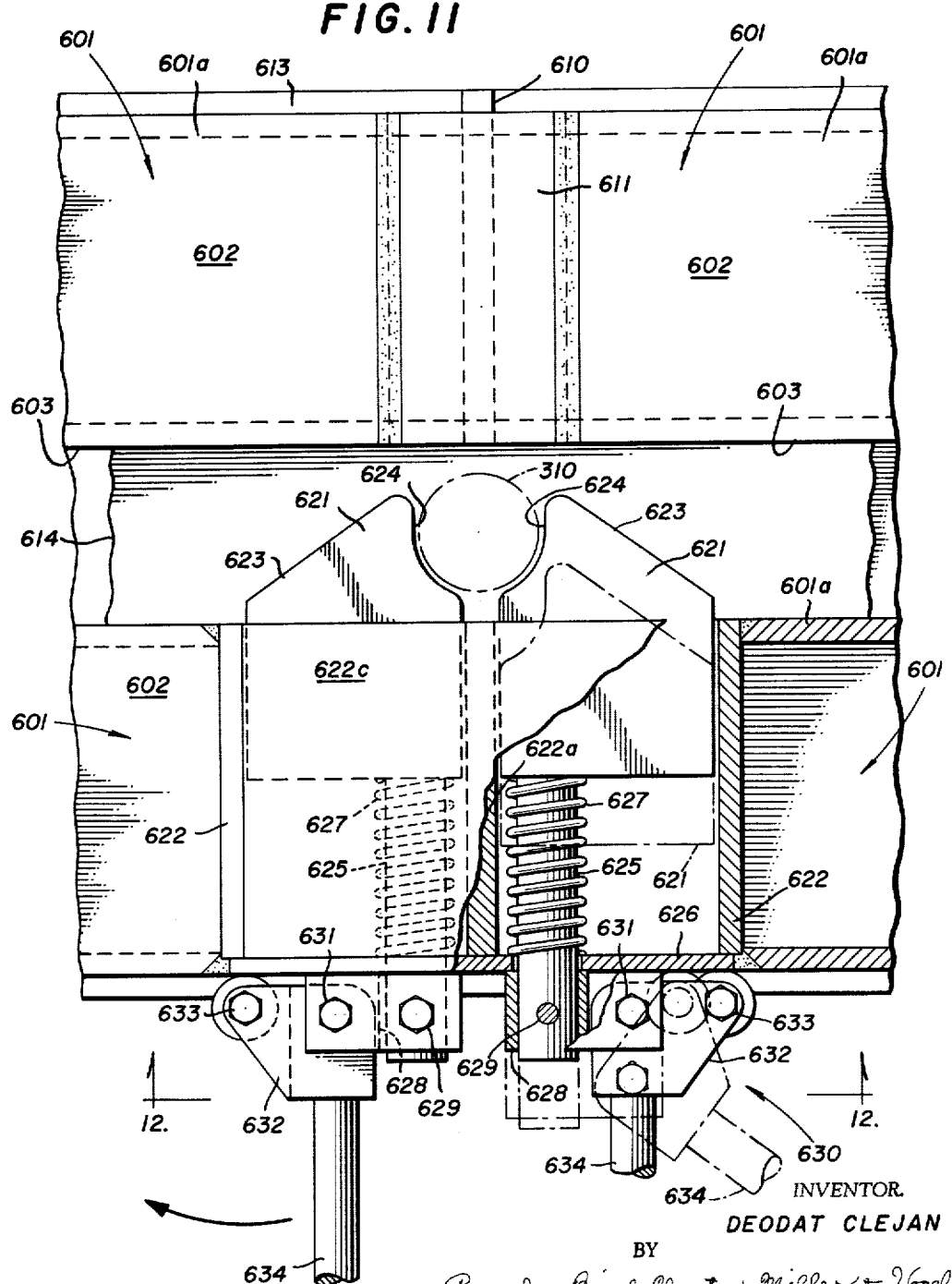

Sept. 3, 1963 D. CLEJAN 3,102,646
METHODS OF LOADING AND OF UNLOADING FREIGHT CONTAINERS
IN FREIGHT TRANSPORTATION SYSTEMS
Filed Nov. 9, 1961 15 Sheets-Sheet 6

INVENTOR.
DEODAT CLEJAN
BY
Prangley, Baird, Clayton, Miller & Vogel
ATTYS.

Sept. 3, 1963 D. CLEJAN 3,102,646
METHODS OF LOADING AND OF UNLOADING FREIGHT CONTAINERS
IN FREIGHT TRANSPORTATION SYSTEMS
Filed Nov. 9, 1961 15 Sheets-Sheet 7

INVENTOR.
DEODAT CLEJAN
BY
Prangley, Baird, Clayton, Miller & Vogel
ATTYS.

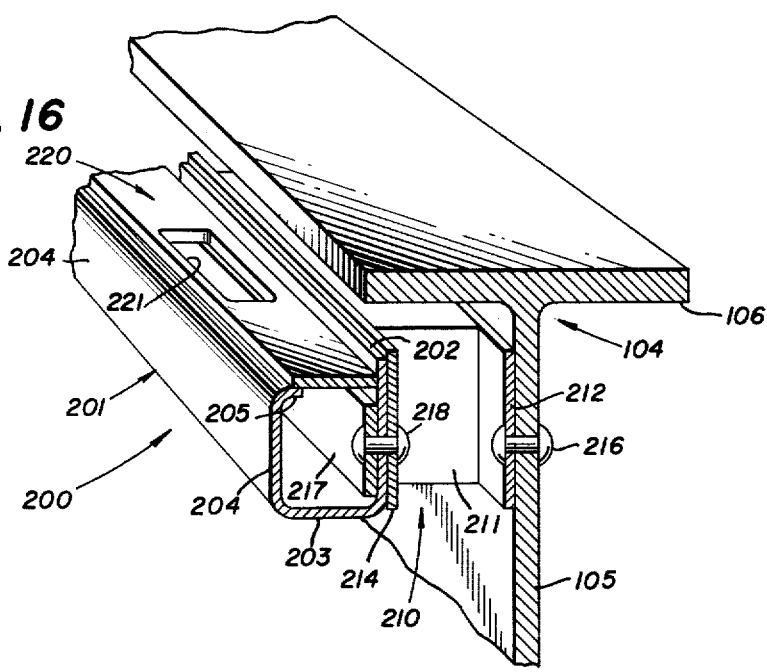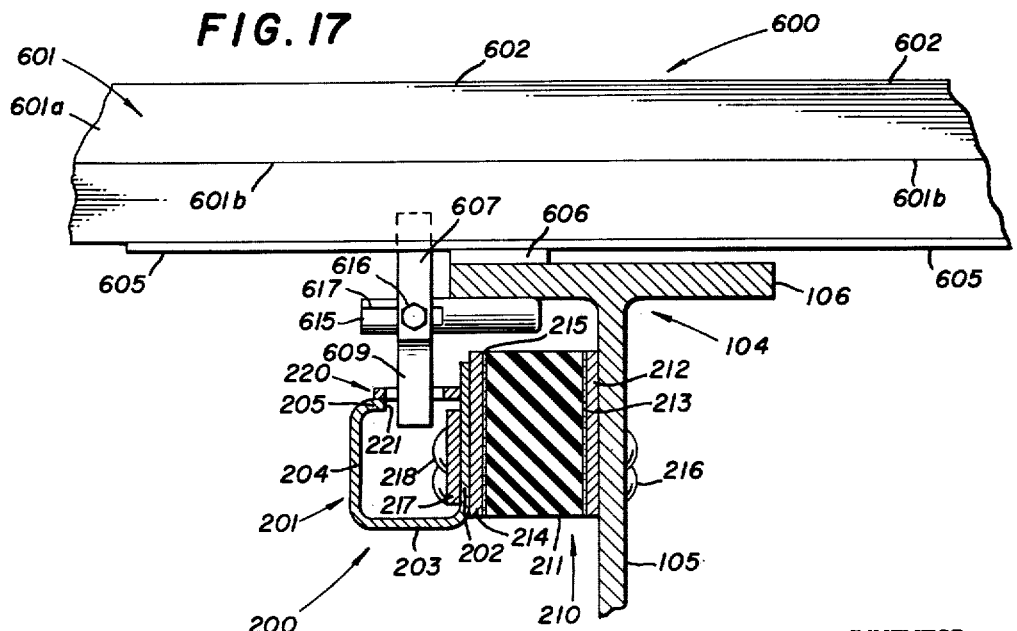

Sept. 3, 1963 D. CLEJAN 3,102,646
METHODS OF LOADING AND OF UNLOADING FREIGHT CONTAINERS
IN FREIGHT TRANSPORTATION SYSTEMS
Filed Nov. 9, 1961 15 Sheets-Sheet 9

INVENTOR.
DEODAT CLEJAN
BY
Prangley, Baird, Clayton, Miller & Vogel
ATTYS.

Sept. 3, 1963 D. CLEJAN 3,102,646
METHODS OF LOADING AND OF UNLOADING FREIGHT CONTAINERS
IN FREIGHT TRANSPORTATION SYSTEMS
Filed Nov. 9, 1961 15 Sheets-Sheet 10
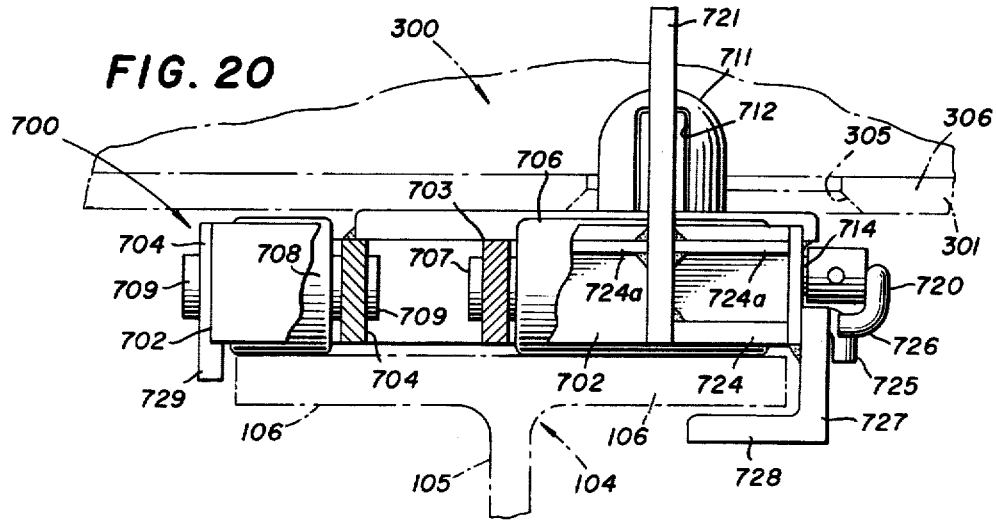
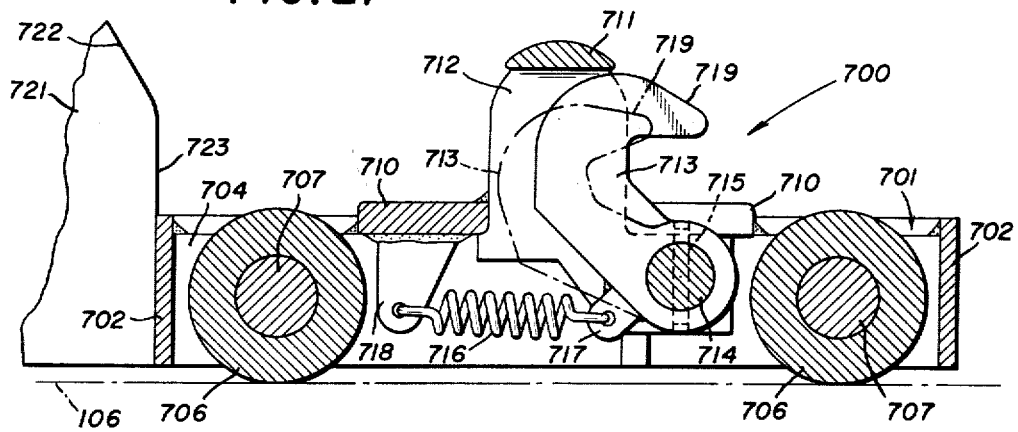
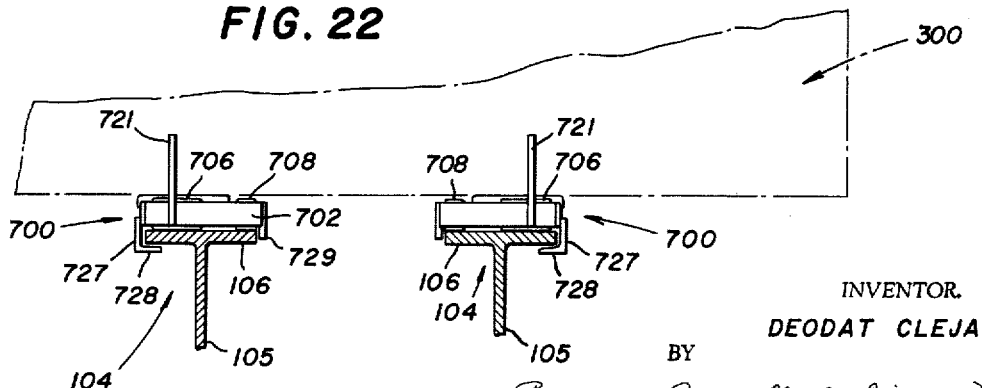
INVENTOR.
DEODAT CLEJAN
BY
Brangley, Baird, Clayton, Miller + Voga
ATTYS.

INVENTOR.
DEODAT CLEJAN

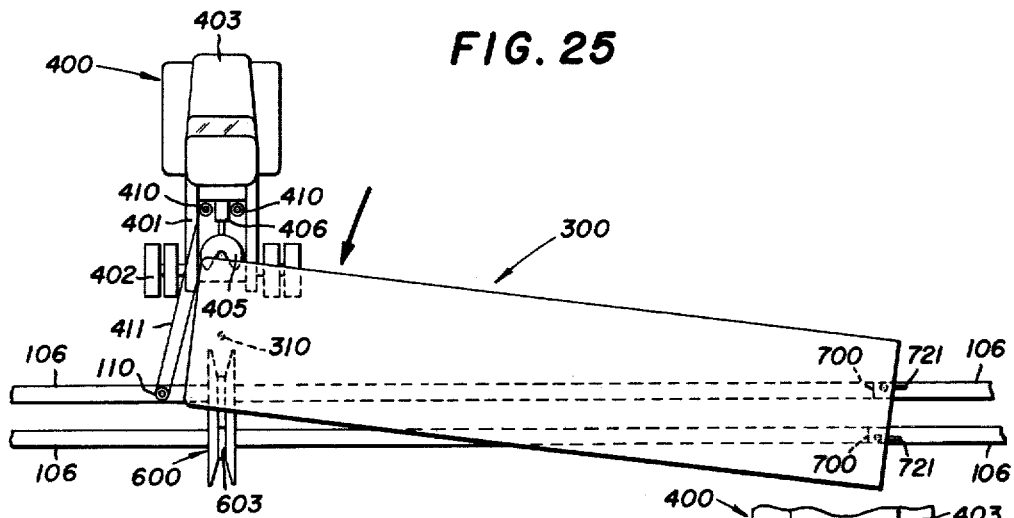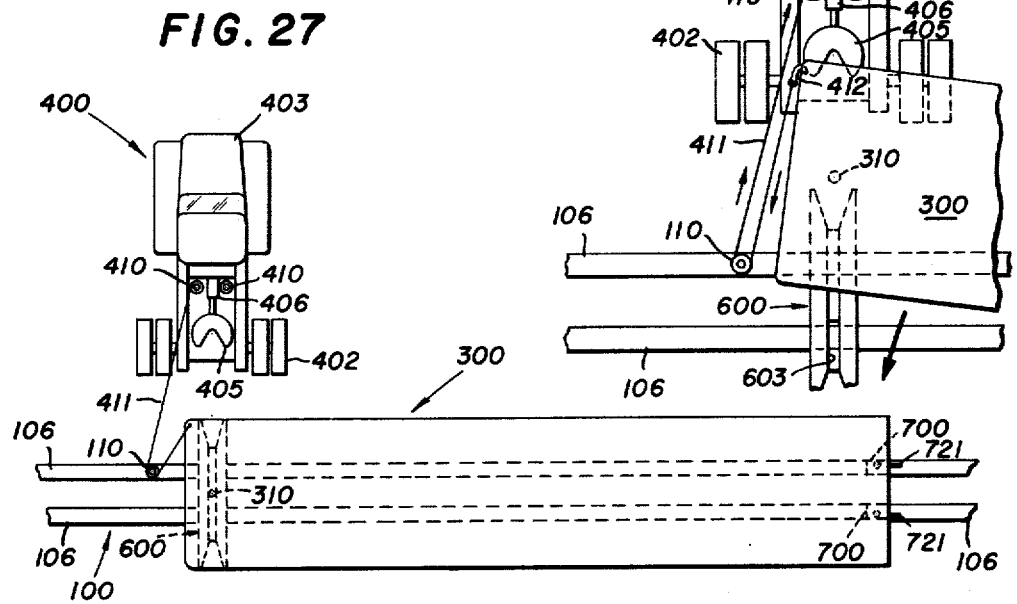

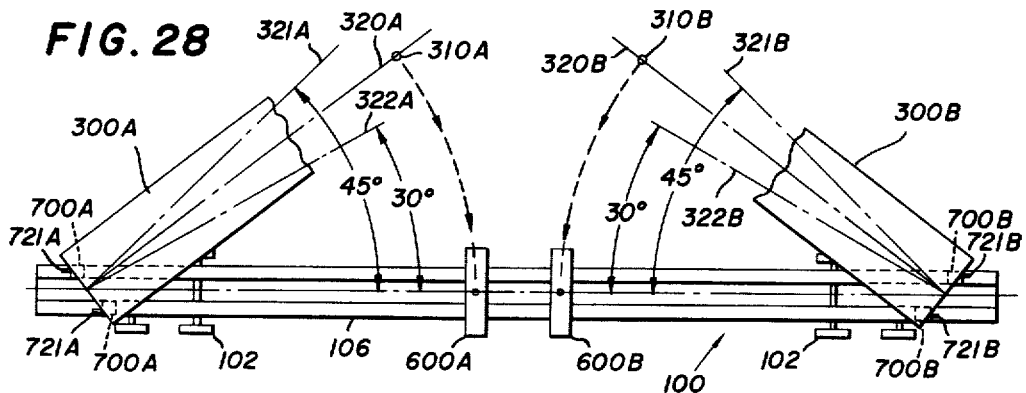
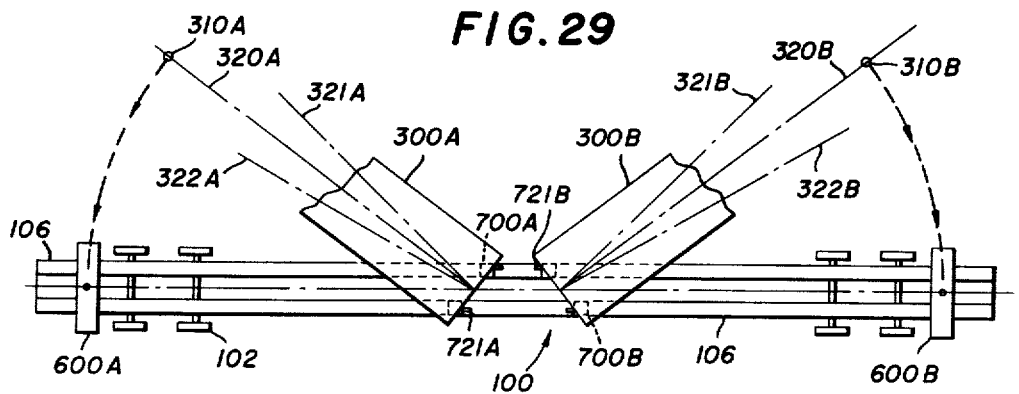
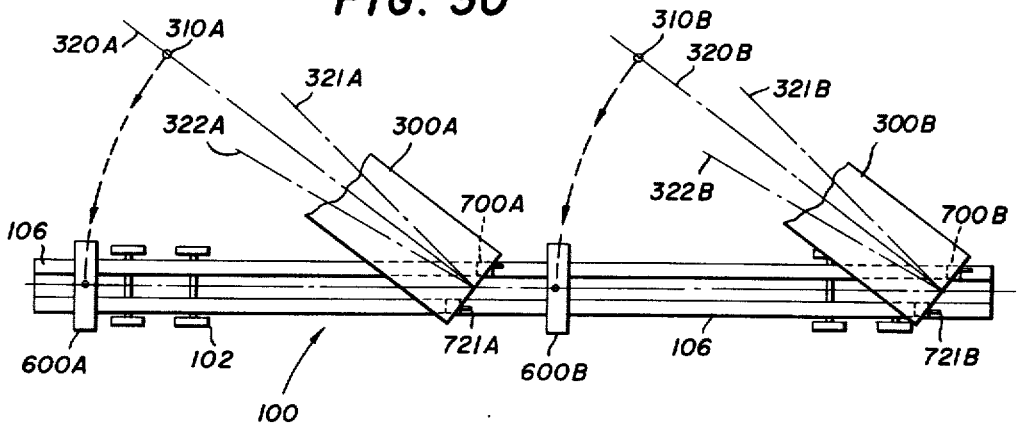

Sept. 3, 1963 D. CLEJAN 3,102,646
METHODS OF LOADING AND OF UNLOADING FREIGHT CONTAINERS
IN FREIGHT TRANSPORTATION SYSTEMS
Filed Nov. 9, 1961 15 Sheets-Sheet 14
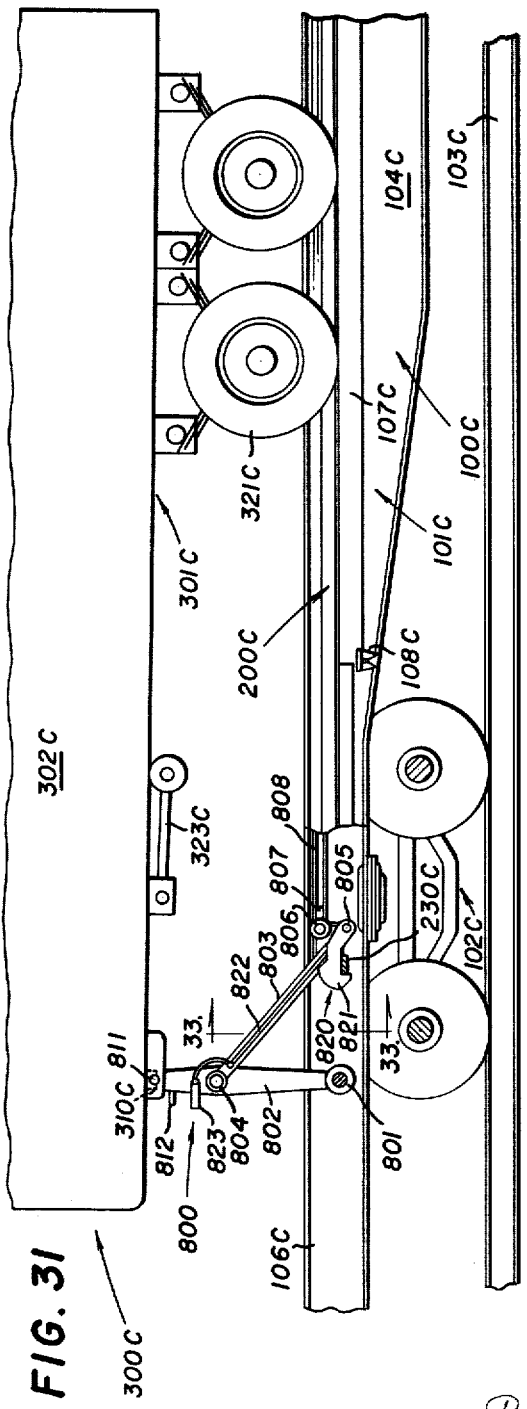
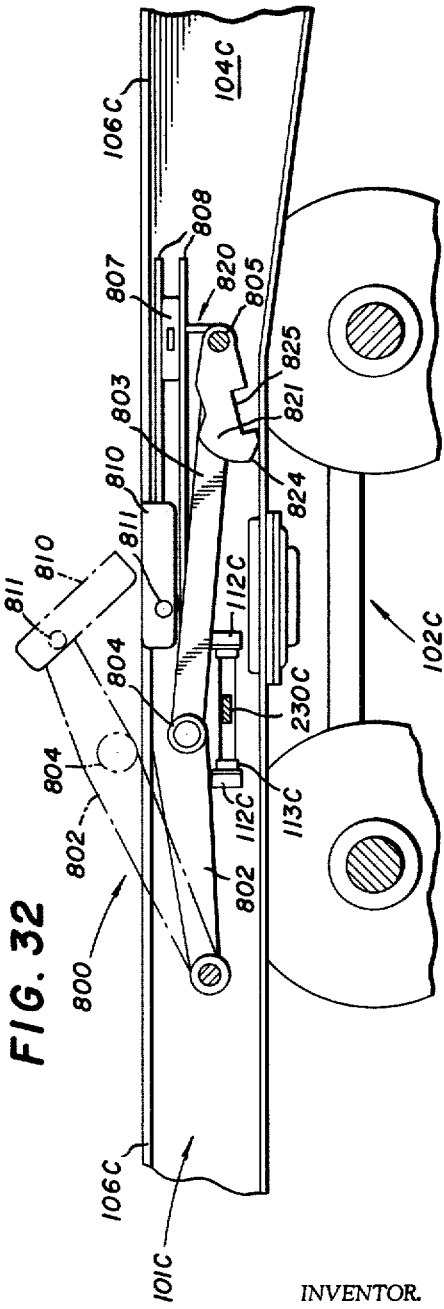
INVENTOR.
DEODAT CLEJAN
BY
Prangley, Baird, Clayton, Miller & Vogel
ATTYS.

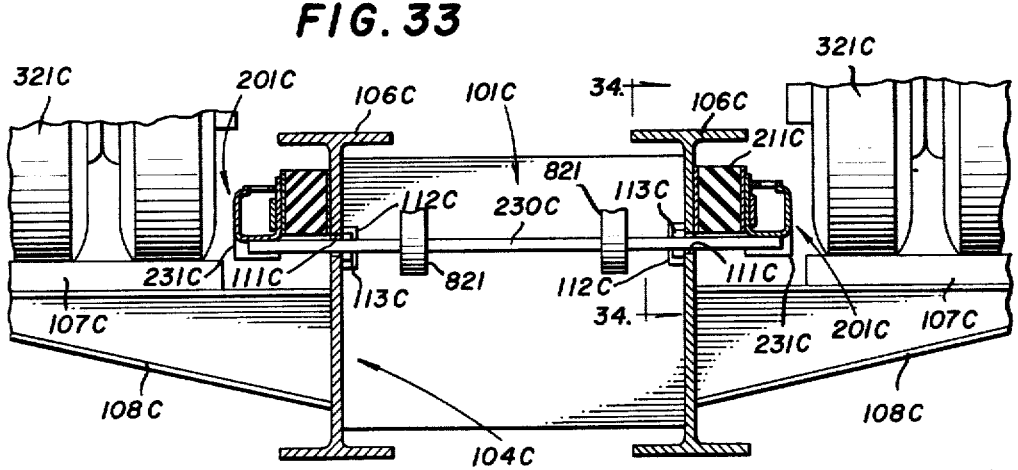
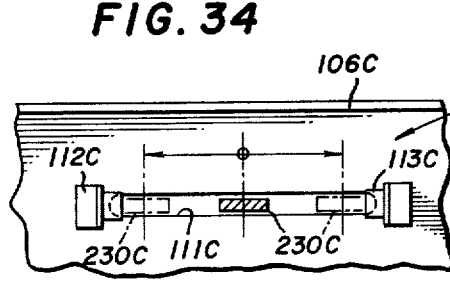
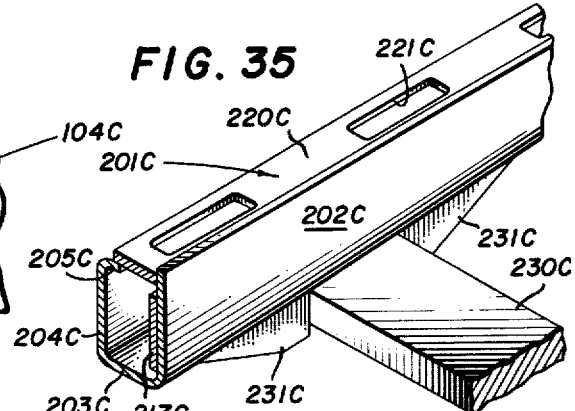
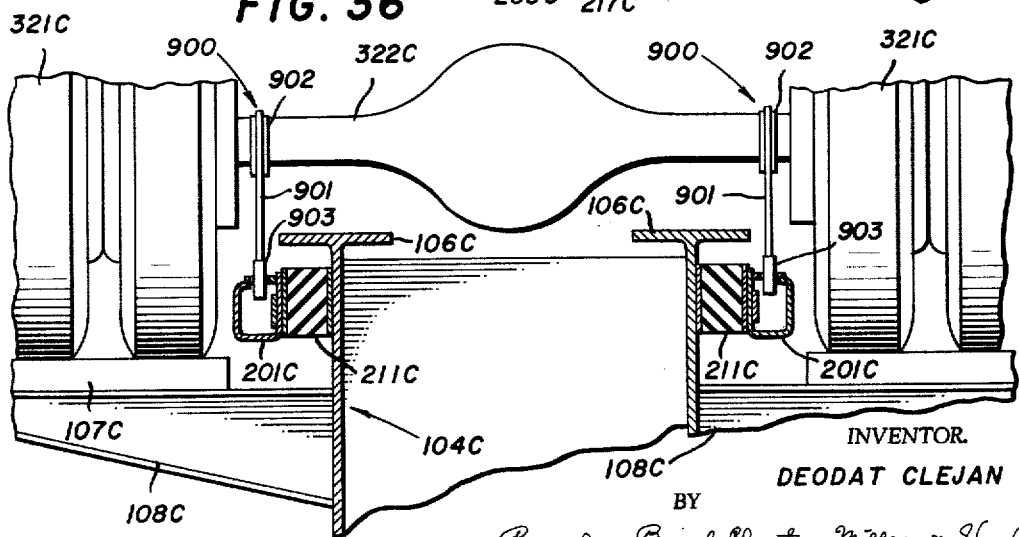

United States Patent Office 3,102,646
Patented Sept. 3, 1963

3,102,646
METHODS OF LOADING AND OF UNLOADING FREIGHT CONTAINERS IN FREIGHT TRANSPORTATION SYSTEMS
Deodat Clejan, Chicago, Ill., assignor to General American Transportation Corporation, Chicago, Ill., a corporation of New York
Filed Nov. 9, 1961, Ser. No. 151,358
6 Claims. (Cl. 214—152)

The present invention relates to methods of loading and of unloading freight containers in freight transportation systems, and more particularly to such methods involving freight containers of the combination road-and-railway type.

It is a general object of the invention to provide an improved method of loading a freight container upon a railway car from the side thereof, wherein the railway car includes a longitudinally extending frame having a pair of rails defining a longitudinally extending track thereon, and wherein the freight container includes an elongated base having a front end carrying a kingpin; the freight container during road transportation thereof is provided at the rear end thereof with a bogie including a body provided with road wheels and facility for selectively connecting and disconnecting the body with respect to the rear end of the base of the container so as to produce therewith a composite road semi-trailer and provided at the front end thereof with a tractor including a chassis carrying road wheels and also a fifth-wheel mechanism adapted to support the front end of the base of the container and provided with facility adapted selectively to couple and to uncouple the kingpin; the freight container during rail transportation thereof is provided at the rear end thereof with a pair of dollies selectively connectible and disconnectible therewith and having rail wheels adapted to engage the rails of the track and provided at the front end thereof with a bolster mounted upon the track and having a facility adapted selectively to couple and to uncouple the kingpin; in a method of loading the container upon the top of the railway car when the front end of the base of the container is supported by the tractor fifth-wheel mechanism and the rear end by the bogie, the tractor is backed to cause the container and the connected bogie to move rearwardly along a first center line disposed at an initial acute angle to the center line of the frame and into a position wherein the rear end of the base of the container overhangs the rails of the track, the dollies are arranged in their supported positions upon the rails of the track below adjacent portions of the rear end of the base of the container, the dollies are connected to the rear end of the base of the container and the body of the bogie is disconnected therefrom to transfer the support of the rear end of the base of the container to the dollies on the track, then the tractor is backed to cause the front end of the container to swing in an arc toward the frame, the bolster is arranged upon the track in intersecting relation with the arc of movement of the kingpin, then the tractor is backed to cause the adjacent front corner of the base of the container to overhang the adjacent outer end of the bolster, the tractor fifth-wheel mechanism is uncoupled from the kingpin and the support of the front end of the base of the container is transferred to the bolster, and then the front end of the base of the container is moved into a centered position on the boltser mounted upon the track so as to cause the bolster to couple the kingpin.

Another general object of the invention is to provide an improved method of unloading a freight container from the side of a railway car of the type set forth utilizing a tractor and a bogie and dollies and a bolster of the type set forth, wherein the method of unloading the container from the top of the railway car when the front end of the base of the container is supported by the bolster coupled to the kingpin and mounted upon the track and when the rear end of the base of the container is supported by the dollies upon the track, the tractor is backed to locate the tractor fifth-wheel mechanism into a position adjacent to one end of the bolster, the bolster is uncoupled from the kingpin, the front end of the container is moved to swing it in an arc onto the tractor fifth-wheel mechanism so as to transfer the support of the front end of the base of the container to the tractor fifth-wheel mechanism and to cause the same to couple the kingpin, the tractor is driven forwardly so as to cause the front end of the container further to swing in an arc into a position wherein the container and the tractor are positioned along a first center line disposed at a final acute angle to the center line of the frame, the body of the bogie is connected to the rear end of the base of the container and forwardly of the dollies and the dollies are disconnected from the base of the container so as to transfer the support thereof to the bogie, and the tractor is driven further forwardly until the rear end of the base of the container is clear of the rails of the track.

Further features of the invention pertain to the particular arrangement of the steps of the loading and the unloading methods involved in the freight transportation system, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fractured side elevational view of a freight transportation system in which the methods of the present invention may be carried out and illustrating one end of a railway car adjacent to a tractor connected to a freight container supported at the front end thereof on the tractor fifth-wheel mechanism and at the rear end thereof on a bogie, the parts being in the position assumed when commencing transfer of the freight container from the tractor and the bogie to the railway car from the side thereof;

FIG. 2 is a side elevational view of a freight transportation system in which the present methods may be carried out and including a railway car mounting two freight containers thereon by means of dollies engaging and supporting the rear ends thereof and bolsters engaging kingpins at and supporting the front ends thereof;

FIG. 3 is an enlarged fragmentary side elevational view of one end of the railway car of FIG. 2 and illustrating one freight container thereon;

FIG. 4 is a fragmentary plan view of the end of the railway car shown in FIG. 3, the outline of a mounted freight carrier having been shown in dashed lines;

FIG. 7 is an enlarged fragmentary plan view, with certain parts broken away, of the bolster for supporting the front end of a freight container;

FIG. 8 is a side elevational view, with certain parts broken away, of the bolster of FIG. 7;

FIG. 9 is an enlarged vertical section of the bolster along the line 9—9 of FIG. 7;

FIG. 10 is an enlarged vertical section of the bolster along the line 10—10 of FIG. 8;

FIG. 11 is a further enlarged fragmentary plan view, with certain parts broken away, of the bolster of FIG. 7 and illustrating particularly the latching mechanism for gripping the kingpin on an associated freight container;

FIG. 16 is an enlarged fragmentary perspective view of the shock-absorbing mechanism;

FIG. 17 is a vertical section of the shock-absorbing mechanism along the line 17—17 in FIG. 14;

FIG. 20 is a rear elevational view, with certain parts broken away, of the dolly shown in FIGS. 18 and 19;

FIG. 21 is a view in vertical section of the dolly along the line 21—21 of FIG. 18;

FIG. 22 is a diagrammatic view, as seen from the rear of the mounting, of a freight container on the railway car using a pair of the dollies of the type illustrated in FIGS. 18 to 21, inclusive;

Figure 5:
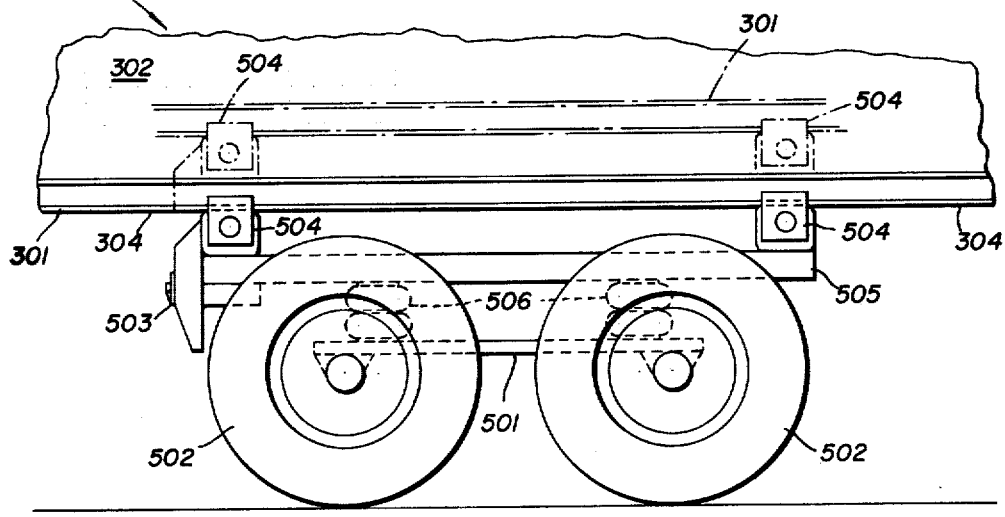
FIG. 5 is an enlarged fragmentary side elevational view of the rear portion of the freight container and supporting bogie of FIG. 1.

FIGS. 23 to 27, inclusive, are diagrammatic illustrations of the sequential placement of the parts of the freight transportation system and the steps of the method of loading a freight container onto the railway car from the side thereof by transferring the freight container directly from the supporting tractor fifth-wheel mechanism and the bogie onto the dollies and bolster on the railway car;

FIG. 28 is a diagrammatic illustration of the manner in which two freight containers are loaded upon a single railway car with the front ends of the freight containers in juxtaposed relation;

FIG. 29 is a diagrammatic illustration of the manner in which two freight containers are loaded upon a single railway car with the rear ends of the freight containers in juxtaposed relation;

FIG. 30 is a diagrammatic illustration of the manner in which two freight containers are loaded upon a single railway car and arranged in tandem relation;

FIG. 31 is a fractured side elevational view of another form of the freight transportation system in which the present methods may be carried out, wherein a road semi-trailer is mounted on a railway car, the rear end of the semi-trailer being supported by its road wheels upon platforms carried by the railway car and the front end of the semi-trailer is supported by a fifth-wheel hitch engaging the kingpin thereof and connected to the shock-absorbing mechanism carried by the railway car;

FIG. 32 is an enlarged fragmentary view in vertical section illustrating the fifth-wheel hitch of FIG. 31 in the retracted position in solid lines and in an intermediate position in dashed lines;

FIG. 33 is a view in vertical section of the railway car and the hitch along the line 33—33 in FIG. 31;

FIG. 34 is a view in section of the railway car and the hitch along the line 34—34 in FIG. 33;

FIG. 35 is a fragmentary view in perspective illustrating the interconnection between the cross bar in the hitch and one of the resiliently mounted members in the shock-absorbing mechanism; and FIG. 36 is a fragmentary view in vertical section illustrating the structure for interconnecting the rear axle housing of a road semi-trailer to the shock-absorbing mechanism on the railway car in the system.

Referring now to FIGS. 1 and 2 of the drawings, the freight transportation system there illustrated, and in which the methods of the present invention may be carried out, essentially comprises a railway car 100, a freight container 300, a tractor 400 and a bogie 500 adapted to support the freight container 300 for road transportation thereof, and a bolster 600 and dollies 700 adapted to support the freight container 300 on the railway car 100 for rail transportation thereof.

The railway car 100 is best illustrated in FIGS. 1–4 and 14–17 and essentially comprises a longitudinally extending center sill 101 of "fish belly" construction supported at the opposite ends thereof by a pair of trucks 102 of standard rail gauge that cooperate with an associated railway track 103, also of standard rail gauge. The center sill 101 essentially comprises a pair of longitudinally extending and laterally spaced-apart I-beams 104 that are suitably connected together at a plurality of longitudinally spaced-apart points by a corresponding plurality of cross braces (not shown). The top flanges 106 of the I-beams 104 constitute a pair of longitudinally extending and laterally spaced-apart rails provided on the top of the center sill 101 and constituting a trackway of given narrow gauge lying between the planes of the inner sides of the rail wheels of the trucks 102.

Two sets of shock-absorbing mechanisms each generally designated by the numeral 200 are mounted on the opposite outer sides of the center sill 101 on the webs 105 of the I-beams 104, each set of shock-absorbing mechanisms including two mechanisms 200 in longitudinal alignment and extending substantially the entire length of the associated I-beam 104, see FIGS. 2 and 3. Each of the shock-absorbing mechanisms 200 includes a longitudinally extending rub rail 201 having a length slightly less than one-half the length of the associated I-beam 104 and disposed laterally outwardly with respect to the web 105 thereof and supported thereon at four longitudinally spaced-apart positions by four resilient mountings 210. Referring particularly to FIGS. 16 and 17, the rub rail 201 is substantially box-shape in cross section and includes a vertically positioned attachment flange 202 connected to the resilient mountings 210 as will be described hereinafter. Extending outwardly from the center sill and the web 105 is a horizontal flange 203 integral with the lower edge of the attachment flange 202 and with the lower edge of an upstanding flange 204 disposed generally parallel to the flange 202 and carrying a support flange 205 on the upper edge thereof, the support flange 205 extending toward the flange 202 but spaced therefrom.

Each of the resilient mountings 210 includes an elastomeric or live-rubber pad or block 211 disposed between two mounting plates 212 and 214 and intimately bonded thereto throughout the contacting surfaces thereof by the adhesive layers 213 and 215, respectively. The ends of the mounting plates 212 and 214 extend beyond the ends of the rubber pad 211 to facilitate connection thereof to the web 105 and the rub rail 211, respectively. More particularly, the ends of the inner mounting plate 212 have holes therein in alignment with similar holes in the web 105 and receive therethrough rivets 216 which fixedly mount the plate 212 upon the outer surface of the web 105 just below the outwardly directed flange 106; and the ends of the outer mounting plate 214 have holes therein in alignment with similar holes in the flange 202 of the rub rail 201 and a mounting plate 217 and receive therethrough rivets 218 which fixedly mount the rub rail 201 upon the plate 214. The rubber pads 211 interconnecting the associated mounting plates 212 and 214 accommodate limited and cushioned longitudinal movements of the rub rail 201 with respect to the I-beam 104, the rub rail 201 being capable of 8" of movement in either direction longitudinally with respect to the associated I-beam 104, whereby the rub rail 201 is capable of a total travel of 16" of shock-absorbed movement. The rubber pads 211 also shock-absorb movements of the rub rail 201 laterally of the associated I-beam 104 to a certain extent. Connection to each of the rub rails 201 is facilitated by the provision of an attachment plate 220 mounted on the support flange 205 thereof and fixedly attached as by welding to the flanges 202 and 205, the attachment plate 220 being disposed substantially horizontally and extending the length of the associated rub rail 201 and having a plurality of equi-distantly spaced-apart holes 221 therein of generally rectangular outline for receiving connectors as will be described more fully hereinafter.

As has been noted above, the rub rail on each side of the railway car 100 is illustrated as being in two sections (see FIGS. 2 and 3) thereby to provide independent action for each section with respect to the other. However, these two sections of the rub rails 201 may be joined together so that the entire rub rail extending along the side of the web 105 of the adjacent I-beam 104 is supported at eight positions by eight associated resilient mountings 210.

There is illustrated in FIGS. 1–6 of the drawings a freight container 300 of the type including a base 301 carrying upstanding walls 302 defining a lading compartment. The base 301 has therein on each side thereof longitudinally extending grooves 303 defining lower outwardly directed flanges 304 used in connecting the bogie 500 thereto as will be explained further hereinafter. The rear end of the base 301 has a pair of elliptical cone holes therein spaced-apart laterally and disposed inwardly with respect to the adjacent rear corner of the freight container 300, see FIG. 19 also, for receiving positioning pins on an associated dolly 700. Each of the cone holes 305 is surrounded by an annular flange 306 for cooperation with locking mechanism carried by the associated dolly 700 as will be described more fully hereinafter. The front end of the base 301 carries a substantially centrally disposed depending kingpin 310, see FIGS. 13 and 14 also, having a reduced portion 311 and a head 312 adapted to be received by the fifth-wheel mechanism of the tractor 400 and by latching mechanism of the bolster 600, all of which will be more fully explained hereinafter.

Figure 23:
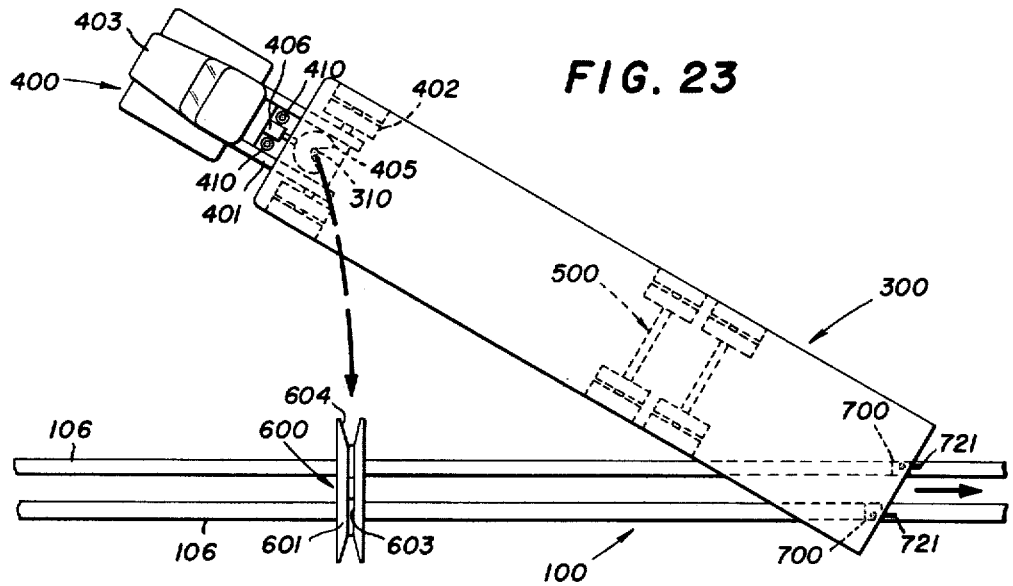

Referring to FIG. 1 of the drawings, the tractor 400 includes a chassis 401 supported by front and rear sets of road wheels 402 and having the usual control cab 403 on the front end thereof and a fifth-wheel mechanism 405 on the rear end thereof. The fifth-wheel mechanism 405 is of the type which can be moved between a relatively low road traveling position and a relatively high transfer position by means of an elevating mechanism 406, the parts being shown in the high transfer position in FIG. 1. Referring further to FIGS. 23 and 27 of the drawings, it will be seen that the chassis 401 is also provided with two winches 410 disposed on opposite sides thereof to the rear of the control cab 403 and having a cable 411 associated therewith carrying a hook 412 on the outer end thereof for the purpose of transferring the front end to the associated freight container 300 from the fifth-wheel mechanism 405 of the tractor 400 onto the bolster 600 on the railway car 100, as will be explained more fully hereinafter.

Figure 6:
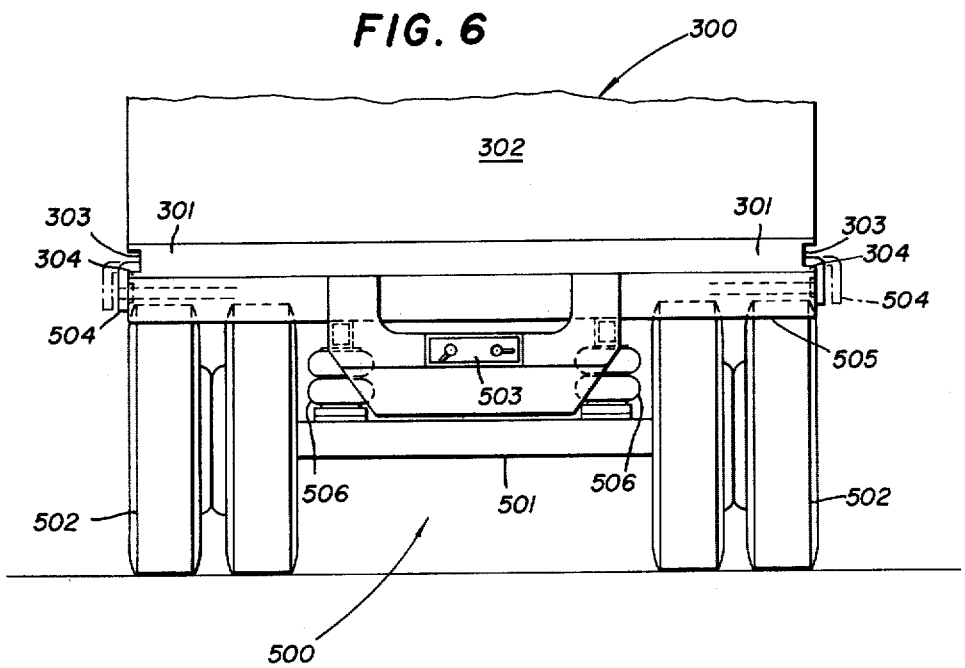
FIG. 6 is an enlarged fragmentary rear elevational view of the freight container and supporting bogie of FIGS. 1 and 5.
Figure 12:
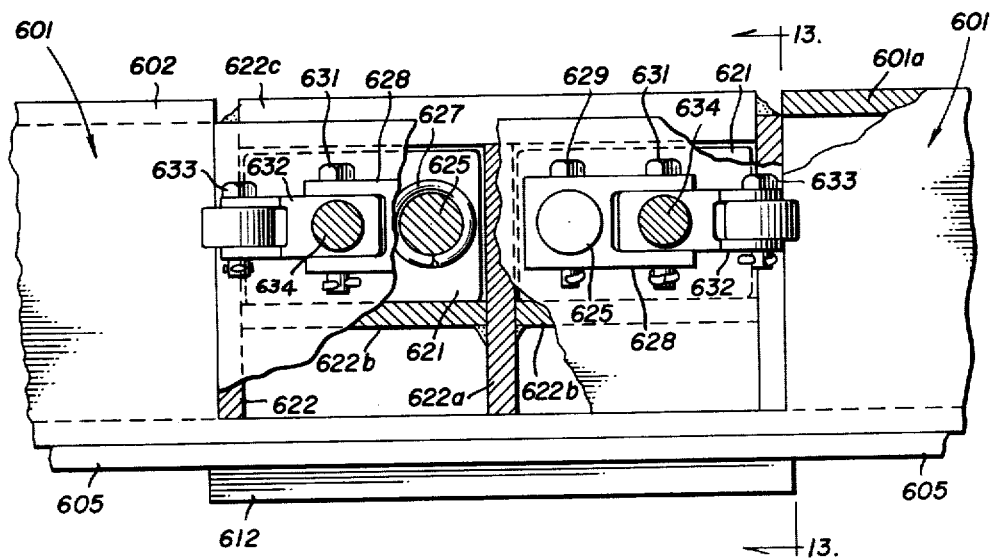
FIG. 12 is a view in vertical section of the bolster along the line 12—12 of FIG. 11.

During road travel of the freight container 300, the rear end thereof is supported by a bogie 500, the construction of which can be best seen in FIGS. 1, 5 and 6 of the drawings wherein it will be seen that the bogie 500 includes a chassis 501 supported by a pair of front and rear road wheels 502, the chassis 501 having mounted thereon a frame 505 that is movable between a relatively low road traveling position and a relatively high transfer position with respect to the chassis 501 the road wheels 502 by means of a hydraulic elevating mechanism 506 mounted on the chassis 501 and independent of the tractor 400 and controlled from a control panel 503, see particularly FIG. 6. The low road traveling position of the frame 505 is illustrated by solid lines in FIG. 5 of the drawings and the relatively high transfer position is illustrated in dashed lines therein. Carried on the frame 505 and movable laterally with respect thereto on each side thereof is a pair of latch members 504 adapted to extend into the channels 303 and to engage the flanges 304 on the base 301 of the associated freight container 300, the latch members 504 being shown in the engaged position by solid lines in FIG. 6 and being shown in the disengaged position by dashed lines therein, whereby when the latch members 504 are in the engaged positions thereof the freight container base 301 is firmly locked to the bogie frame 505 and when the latch members 504 are in the disengaged positions thereof the freight container base 301 may be readily lifted and removed from the bogie frame 505.

The details of the construction of the bolster 600 are best illustrated in FIGS. 7 to 9 of the drawings, wherein it will be seen that the bolster 600 comprises two longitudinally spaced-apart hollow box-like elements 601 that extend laterally across the I-beams 104 and include two channels 601a having the facing legs thereof joined as by welding at 601b and providing slide plates 602 including downwardly inclined portions 602a adapted slidingly to receive the front end of a freight container base 301 thereon, the space between the elements 601 providing a channel 603 adapted to receive the kingpin 310 therein. The opposite ends of the elements 601 and the slide plates 602 forming a part thereof are tapered away from each other as at 604 to provide a converging opening for guiding the kingpin of the associated freight container 300 into the channel 603. The elements 601 are further tied together adjacent to the opposite ends thereof by plates 605 which also carry four sill skids 606 so that the bolster 600 as a whole is supported for sliding movement longitudinally upon the top flanges 106 of the associated railway car. The opposite ends of the bolster 600 also carry two downwardly directed tab-like parts 607 having the upper ends thereof respectively extending upwardly through the associated plate 605 and the bottom of the associated elements 601 at points spaced outwardly with respect to the flanges 106 and fixedly secured thereto as by welding at points 608, the lower end of the parts 607 more particularly including a downwardly directed plunger 609 adapted to engage in an associated hole 221 in the associated attachment plate 220 of the shock-absorbing mechanism.

Figure 14:
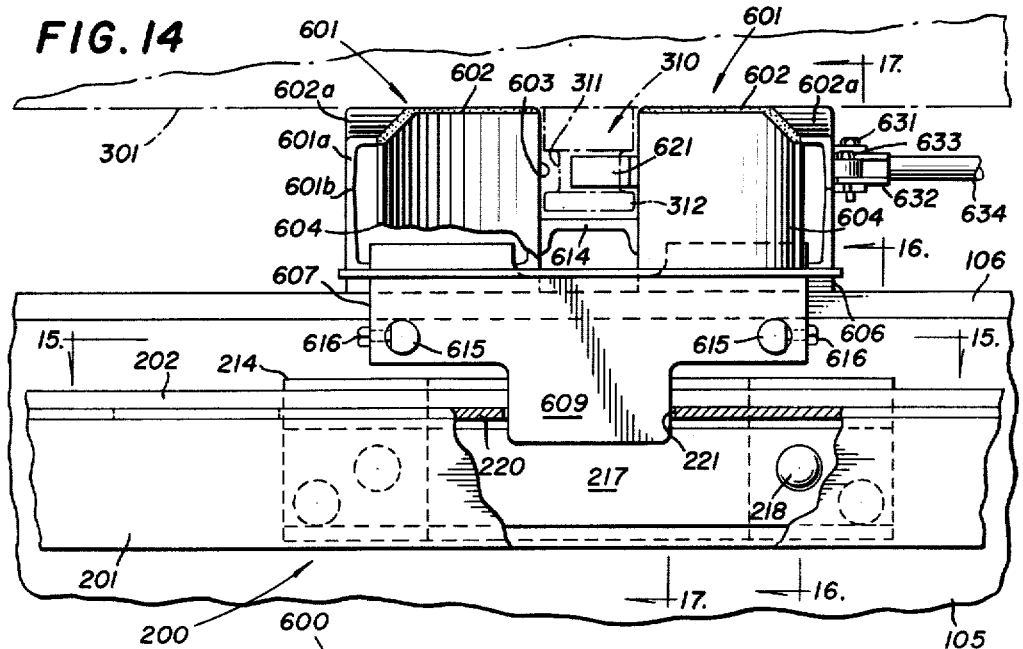
FIG. 14 is a greatly enlarged side elevational view, with certain parts broken away, of the bolster and the associated shock-absorbing mechanism carried by the railway car, the parts mentioned being enclosed within the dashed circle of FIG. 3.
Figure 15:
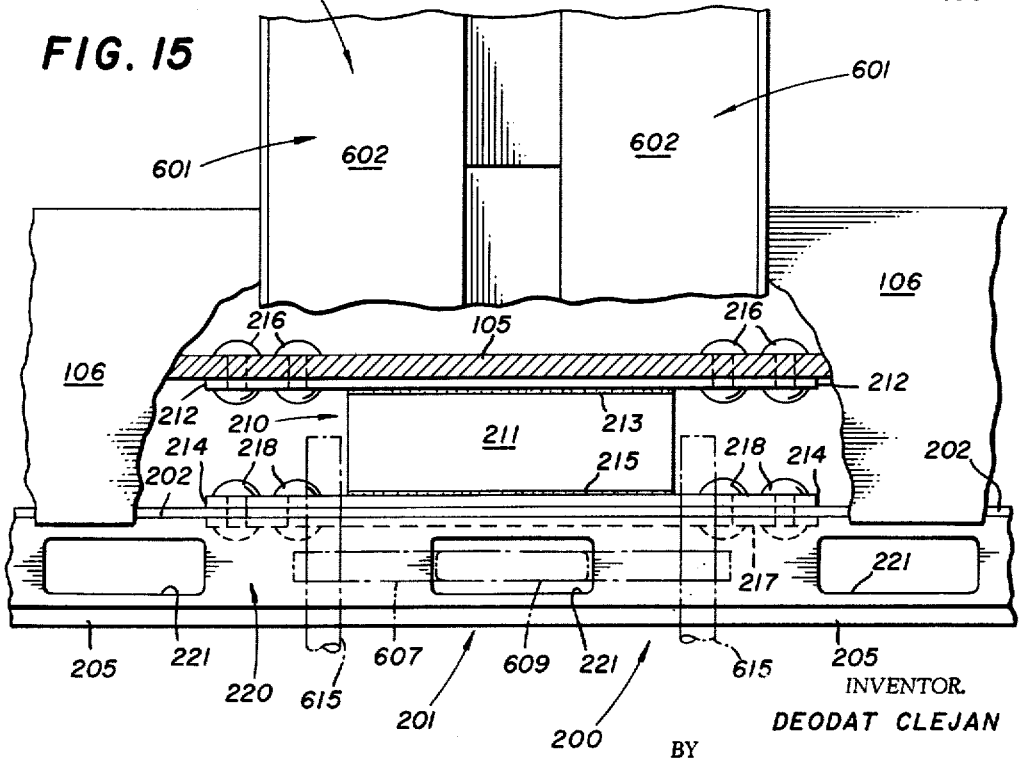
FIG. 15 is an enlarged plan view, partly in horizontal section, at the bolster, of the shock-absorbing mechanism.

It is desirable during operation of the railway system, for reasons which will be apparent hereinafter, that the bolster 600 be locked against inadvertent upward movement with respect to the flanges 106 of a type such that the plungers 609 would be removed from the holes in the associated attachment plates 220, and to this end each of the tab-like parts 607 is provided adjacent to each end thereof with a laterally extending circular aperture receiving a bolt 615 having the longitudinal axis thereto disposed laterally with respect to the railway car and extending under the associated top flange 106 as is best illustrated in FIGS. 14, 15 and 17 of the drawings. A set screw 616 is provided for each of the bolts 615 and, more specifically, is positioned in a threaded aperture in the associated part 607 extending longitudinally of the railway car and having the end thereof bearing against a flat 617 formed on the side of the associated bolt 615. In order to lock the bolster 600 upon the top of the center sill of the associated railway car, the bolts 615 are each moved to the position illustrated in FIG. 17 and the associated set screws 616 tightened against the flat 617 thereon, whereby to lock the bolt 615 in its engaging position beneath the associated top flange 106. When it is desired to remove the bolster 600 from the associated railway car or to shift the bolster 600 longitudinally along the center sill thereof, the set screws 616 are loosened and the bolts 615 withdrawn, thereby to permit the desired movement of the bolster 600 with respect to the center sill and particularly the top flanges 106 thereof.

One of the box-like elements 601 is reinforced centrally thereof by a longitudinal plate 610 (see FIG. 9 particularly) and by a horizontal plate 611 adapted to be positioned in alignment with a kingpin of the associated freight container 300 and by a lower reinforcing plate 612 interconnecting the two box-like elements 601. The outer wall of the reinforced box-like element 601 also carries a pair of tie plates 613 which further serve to reinforce the bolster 600 at this point. Also arranged in the central portion of the bolster between the box-like elements 601 is an inverted channel member 614 which is positioned so that it will be disposed below the extreme lower end of the kingpin 310 carried by the front end of the associated freight container 300.

The other box-like element 601, i.e., the one disposed toward the bottom in FIG. 7 and disposed toward the right in FIG. 10, carries a locking mechanism 620 which is adapted to lock the kingpin 310 of an associated freight container 300 in place in its supported position upon the bolster 600, further details of the locking mechanism being illustrated in FIGS. 11 to 14 of the drawings. More specifically, the locking mechanism 620 includes a pair of jaws 621 which are mounted for reciprocal sliding motion within the associated box-like element 601 and more specifically between pairs of longitudinally extending plates 622 and 622a and upon plates 622b and below plates 622c mounted therein. The outer forward edge of each of the jaws 621 is tapered as at 623 and connects with a part circular holding surface 624 adapted to receive and hold an associated kingpin 310. Means is provided to bias each of the jaws 621 independently of the other toward the position illustrated by solid lines in FIG. 11 including a shaft 625 extending through an opening in the rear of the element 601 and more specifically through an opening in the plate 626 thereof and carrying thereabout a spring 627 under compression and continually urging the associated jaw 621 toward the latching position thereof illustrated by solid lines in FIG. 11. The rear end of the shaft 675 carries a collar 628 held thereon by a set screw 629 whereby to limit and determine the forward or latching position of the jaw 621.

In order to release a kingpin 310 locked between the jaws 621 within the channel 603, it is necessary to retract at least one of the jaws 621 to the position illustrated by dashed lines in FIG. 11 and to this end a suitable linkage mechanism 630 has been provided. More specifically, the collar 628 has a pair of outwardly extending flanges thereon which are pivotally connected by a bolt 631 to a lever 632 which is in turn pivotally mounted upon the bolster 600 by a bolt 633. The lever 632 also carries an outwardly extending handle 634 which is useful in operating the lever 632 thereby to move the associated jaw 621 against the action of the spring 627 from the position illustrated by solid lines in FIG. 11 to that illustrated by dashed lines therein. If desired the lever 632 can be operated from a remote point by a suitable linkage mechanism 640 best illustrated in FIG. 7 of the drawings wherein the lever 632 is pivotally connected to a tie-rod 641 extending laterally outwardly and pivotally interconnecting with another lever 642 pivotally mounted on the adjacent element 601 as at 643, the lever 642 including a handle portion 644 facilitating operation thereof. Movement of the handle 644 in the direction of the arrow from the solid line position thereof to the dashed line position thereof serves to open or retract the attached jaw 621. Likewise, movement of the handle 634 in FIG. 7 in the direction of the arrow will retract the attached jaw 621 to the unlatched position thereof.

The locking mechanism 620 is automatically operable to engage and lock in place the kingpin 310 on associated freight container 300 upon movement of the kingpin 310 along the channel 603 and into engagement with the locking jaw 621. More particularly, when engaging a kingpin 310 with the locking mechanism 620 upon the bolster 600, the kingpin is directed by the converging ends 604 into the channel 603 and continued movement of the kingpin 310 and the associated freight container 300 will bring the kingpin into engagement with the tapered edge 623 of the locking jaw 621 disposed thereforward. Engagement of the kingpin 310 with the tapered edge 623 forces the associated jaw 621 from the position illustrated in solid lines to the right in FIG. 11 to the position illustrated by dashed lines therein, whereby to permit the kingpin 310, for example, to move from the right in FIG. 11 against the right hand locking jaw 621 and to place the kingpin 310 against the holding surface 624 on the left hand jaw 621. As the kingpin 310 passes the outer edge of the right hand jaw 621, that jaw will move upwardly toward the solid line position thereof until the kingpin 310 is engaged on either side thereof by the holding surfaces 624 of the locking jaws 621 and within the channel 603. The holding surfaces 624 are so designed that the pressure of the kingpin 310 thereagainst will not cause retraction of the associated locking jaw 621 and accordingly the kingpin 310 is firmly and automatically locked in place. In order to release the kingpin 310 from the locking mechanism 620 and particularly the locking jaws 621 thereof, it is necessary to actuate either the handle 634 or the handle 644, thereby to retract the connected locking jaw 621 to the unlatched position thereof, whereby to permit movement of the kingpin 310 along the channel 603 past the retracted locking jaw 621 and thus away from the locking mechanism 620.

Figure 18:
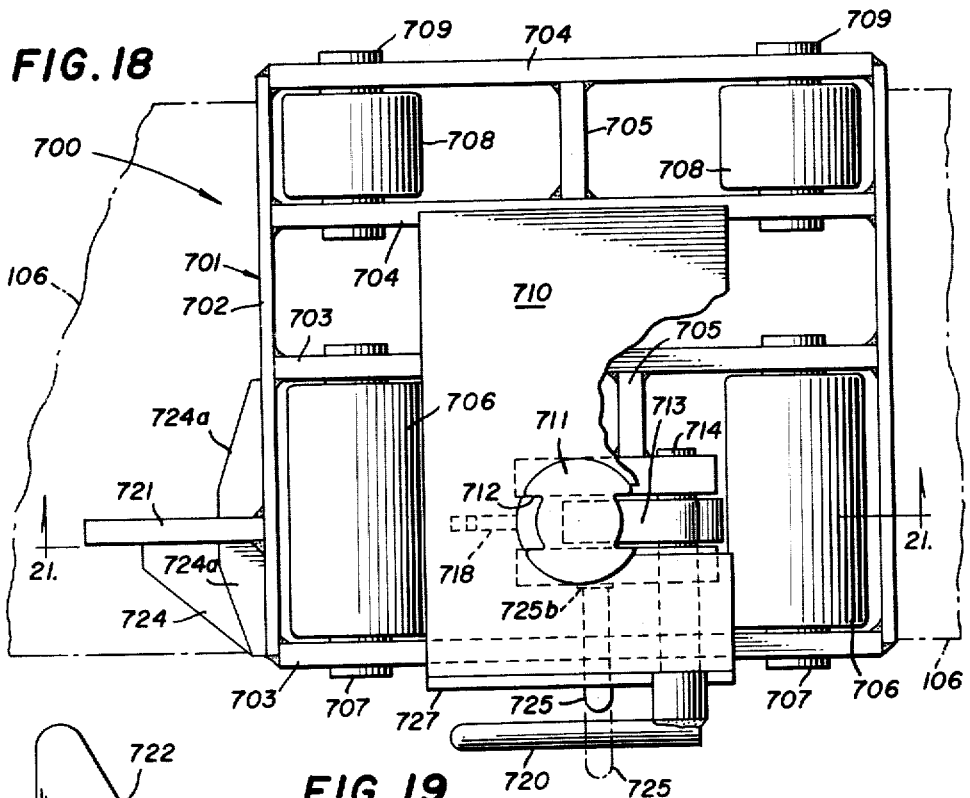
FIG. 18 is a plan view, with certain parts broken away, of a dolly employed in the present system and method.

During rail travel of the freight container 300, the rear end of the base 301 thereof is supported for longitudinal movement upon the center sill 101 of the associated railway car 100 by means of a pair of dollies 700 which are constructed respectively right and left, whereby one dolly is the mirror image of the other, and for purposes of illustration, the right-hand dolly 700 has been illustrated in detail in FIGS. 18 to 22 of the drawings; in the interest of brevity, the construction of the right-hand dolly 700 will be described in detail, but it is to be understood that the left-hand dolly 700 has a like construction which is the mirror image of the construction of the right-hand dolly 700. Referring particularly to FIG. 18 of the drawings, it will be seen that the dolly 700 comprises a generally rectangular frame 701 including two laterally extending frame members 702 interconnected by a first pair of longitudinal frame members 703 and a second pair of longitudinal frame members 704, the frame 701 including braces 705 extending laterally for reinforcement purposes. The frame 701 rides upon the top flange 106 on the associated I-beam 104 and is supported thereon by a first pair of longitudinally spaced-apart wide outside rollers 706 carried by axles 707 mounted on the frame members 703 and by a second pair of longitudinally spaced-apart narrow inside rollers 708 carried by axles 709 mounted on the frame members 704. Also mounted on the frame 701 is a plate 710 which carries an upstanding pin 711 having a hollow central portion 712. see FIG. 12 particularly, in which is disposed a hook 713 pivotally mounted with respect thereto. More particularly, the lower end of the hook 713 has an opening therein receiving therethrough a shaft 714 fixedly connected to the hook 713 by means of a pin 715 and journalled for rotation with respect to the frame 701, the hook 713 being movable upon rotation of the shaft 714 between a retracted position disposed substantially wholly within the hollow portion 712 of the pin 711 (the position illustrated by the dashed lines in FIG. 21), and a latching position wherein the hook 713 extends outwardly from the pin 711 (the position illustrated by solid lines in FIG. 21). Moreover, the hook 713 is continually urged and biased toward the latching position thereof by a coil spring 716 under tension connected between a first arm 717 fixedly secured to the lower end of the hook 713 and a second arm 718 fixedly secured to the plate 710, whereby the spring 716 urges the hook 713 in a clockwise direction as viewed in FIG. 21 outwardly of the pin 711 into a forwardly hooked and latching position.

Figure 19:
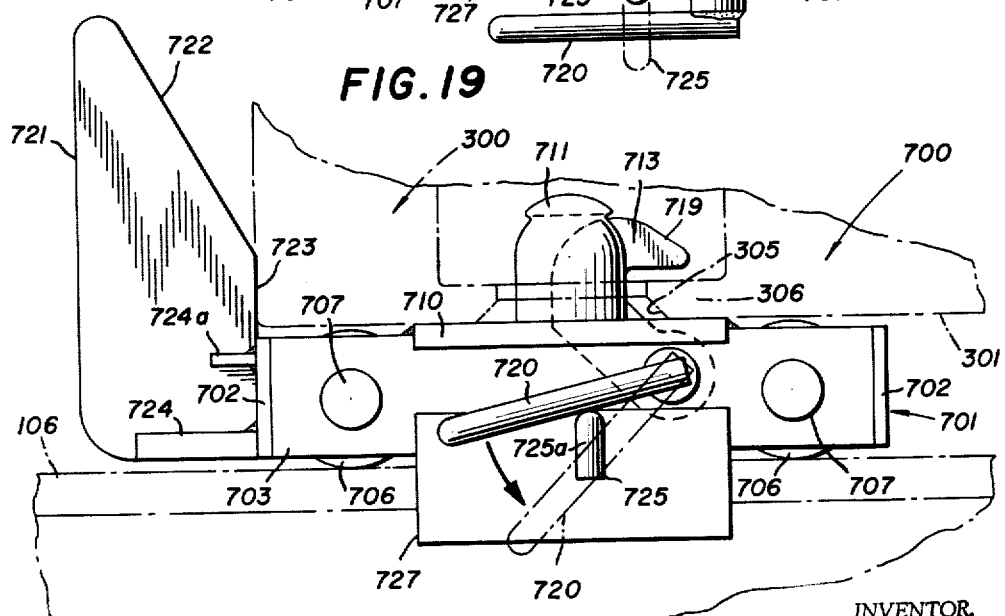
FIG. 19 is a side elevational view of the dolly illustrated in FIG. 18, a portion of the associated freight container and a portion of the railway car being shown in dashed lines.

The pin 711 is adapted to be received in one of the elliptical cone holes 305 in the freight container base 301, see FIG. 19, and moreover the hook 713 is provided with a cam surface 719 on the upper forward portion thereof which is engaged by the surface defining the cone hole 305 thereby to move the hook 713 in a counterclockwise direction into its retracted position upon movement of the base 301 downwardly with the pin 711 substantially centered in the cone hole 305. When the freight container base 301 rests upon the dolly plate 710, the cam surface 719 of the hook 713 moves out of engagement with the surface defining the cone hole 305 and is free to be moved to the forward hooked position thereof under the urging of the spring 716 whereby the hook 713 overlies the annular flange 306 surrounding the cone hole 305, thus to lock the container 300 in its supported position upon the associated dolly 700 as shown in FIG. 19.

Before the freight container 300 can be removed from the dolly 700, the hook 713 must be moved to its retracted position within the pin 711 and this is accomplished by manually retracting the hook 713, a handle 720 being fixedly connected to the shaft 714 for this purpose. Means also is provided fixedly to hold the handle 720 in the position thereof corresponding to the latching position of the hook 713, the position illustrated by solid lines in FIG. 19, or to hold the handle 720 in the position thereof corresponding to the retracted position of the hook 713, the position illustrated by dashed lines in FIG. 19; more specifically, there has been provided the locking pin or stop 725 mounted for sliding movement in the frame 701 and including an outer downturned handle portion 725a and an enlargement 725b on the inner end thereof whereby to trap the pin 725 on the frame 701. The pin 725 has a released position illustrated by solid lines in FIG. 18 wherein it is out of alignment with the handle 720 controlling the hook 713 and an outer locking position illustrated by dashed lines in FIG. 18 wherein it engages the handle 720 to lock the handle in either the hooking position thereof illustrated by solid lines in FIG. 19 or the retracted position thereof illustrated by dashed lines in FIG. 19, the pin 725 being readily slidable manually between its released and locking positions. It will be understood that when it is desirable to remove the container 300 from the dolly 700, the handle 720 is moved to the dashed position thereof shown in FIG. 19 whereupon the locking pin 725 is moved outwardly to its locking position engaging the handle 720 so as to restrain the handle in its unlatching position corresponding to the retracted position of the hook 713, whereby the hook 713 disengages the flange 306 surrounding the cone hole 305, and, accordingly, the associated rear corner of the container 300 may be lifted so as to disengage the pin 711 from the base 301 to free the associated corner of the container 300 from engagement with or attachment to the associated dolly.

It further is desirable to guide the freight container 300 into the proper supported position with respect to the associated dolly 700 to ensure that the pin 711 is in vertical alignment with the cone hole 305 before the entire weight of the freight container 300 is placed in its final supported position upon the dolly 700, and to this end a back tail piece 721 has been provided on the frame 701. The tail piece 721 extends rearwardly from the frame 701 and includes an upwardly and rearwardly inclined guide surface 722 adapted to engage the bottom rear edge of an associated freight container 300 for guiding the freight container 300 to the proper position wherein the rear surface thereof rests against a positioning surface 723 on the forward portion of the tail piece 721. Since the tail piece 721 may temporarily support a portion of the weight of the rear end of the freight container thereon, reinforcing plates 724 and 724a have been provided further interconnecting the tail piece 721 and the dolly frame 701.

Further, it will be observed in FIG. 20 that the outer side of the dolly 700 carries a downwardly and inwardly directed L-shaped keeper 727 including a retaining flange 728 underlying closely the associated top flange 106 on the associated I-beam 104, whereas the inner side of the dolly 700 carries a downwardly directed bumper 729 spaced closely to the adjacent edge of the top flange 106. The vertical leg of the keeper 727 and the bumper 729 serve to limit the lateral movement of the dolly 700 and the container 300 mounted thereon with respect to the associated I-beam 104, whereas the retaining flange 728 on the keeper 727 also serves to limit vertical movement or upriding of the dolly 700 and the container 300 mounted thereon with respect to the top flange 106 to the I-beam 104. The manner in which the pair of left hand and right hand dollies cooperate to support the rear end of an associated freight container 300 and to limit lateral and vertical movement thereof with respect to the top flanges 106 on the I-beams 104 is further diagrammatically illustrated in FIG. 22 of the drawings, the view being from the rear of the freight container 300.

The above described apparatus comprising the railway car 100 including an improved shock-absorbing mechanism 200 thereon, the freight container 300, the tractor 400, the bogie 500, the improved bolster 600 and the improved dollies 700 mutually cooperate to provide an improved freight transportation system of the rail-and-road type, and in addition facilitate an improved method of loading the container 300 from its road-traveling position on the tractor 400 and the bogie 500 to its rail-traveling position on the railway car 100 and supported thereon by a bolster 600 and the dollies 700; and likewise, the unloading of the freight container 300 from its rail-traveling position on the railway car 100 supported thereon by the bolster 600 and the dollies 700 to its road-traveling position upon the tractor 400 and the bogie 500.

Considering first the present inventive method of loading the freight container 300 from its road-traveling position supported by the tractor 400 and the bogie 500 onto the railway car 100, with particular references to FIGS. 1 to 5 and 23 to 27 of the drawings, it is necessary to elevate the freight container 300 from its lower road traveling position to its upper transfer position by actuating the elevating mechanism 406 on the tractor 400 by manipulating the controls within the control cab 403 to raise the front end of the freight container 300, and by actuating the elevating mechanism 506 on the bogie 500 by manipulating the controls therefor on the control panel 503 to elevate the rear end of the freight container 300. The tractor 400 with the freight container 300 attached thereon is maneuvered along the railway car 100 and then backed toward the railway car 100 with the center line of the freight container 300 at an initial acute angle between about 30° and 45° with respect to the center line of the railway car 100, see FIG. 23, the longitudinal axes of the tractor 400 and the freight container 300 being preferably in longitudinal alignment as illustrated therein. It will be noted that the bogie 500 is positioned along the base 301 a substantial distance from the rear end of the freight container 300 whereby when approaching the railway car 100 of the narrow center sill type, the rear end of the container 300 and the base 301 thereof overlie the top flanges 106 and in fact the midpoint of the rear end of the freight container 300 actually substantially overlies the longitudinal center line of the railway car 100 with the frame 301 elevated above the dollies 700 positioned on the flanges 106. After the freight container 300 and the tractor 400 have been placed in the position illustrated in FIG. 23, the pair of dollies 700 are rolled along the top flanges 106 until the pins 711 thereof are disposed respectively below the pair of laterally spaced-apart elliptical cone holes 305 provided in the freight container base 301, it being noted that the dollies 700 will be longitudinally offset with respect to each other along the railway car 100 because of the angle between the center line of the railway car 100 and the center line of the freight container 300.

The elevating mechanism 506 on the bogie 500 is then operated by means of the controls 503 to lower the rear end of the freight container 300 upon the dollies 700, and in so lowering the freight container 300, the pins 711 are received in the associated cone holes 305 of the container base 301 (see FIG. 19), the conical surfaces defining the holes 305 moving against the cam surfaces 719 to move the respective hooks 713 to the retracted position within the associated pins 711, it being noted that the locking pin 725 must be in its non-locking position. As the container frame 301 is lowered upon the pins 711, the flanges 306 will pass the outer ends of the associated hooks 713 permitting the associated springs 716 to move the hooks 713 to the hooked or latching positions thereof as illustrated by solid lines in FIGS. 19 and 21 of the drawings. The rear end, and more particularly the rear corners, of the freight container 300 are now firmly connected to the respective dollies 700 for rolling longitudinal movement upon the railway car 100 and particularly the top flanges 106 thereof. At the same time when the rear end of the freight container 300 is lowered by the bogie 500, the fifth-wheel mechanism 405 is preferably lowered by operating the mechanism 406 to maintain the freight container 300 in a substantially horizontal position.

The latch members 504 (see FIG. 6) interconnecting the frame 505 of the bogie 500 and the frame 301 of the freight container 300 are then disconnected by moving them from the inner solid line position thereof to the outer dashed line position thereof thus to disengage the latch members 504 from the flanges 304 on the container base 301. The elevating mechanism 506 of the bogie 500 is then further operated by manipulation of the controls 503 to lower the bogie frame 505 away from the freight container 301 a substantial distance to insure clearance therebetween during the remainder of the loading operation.

Figure 24:
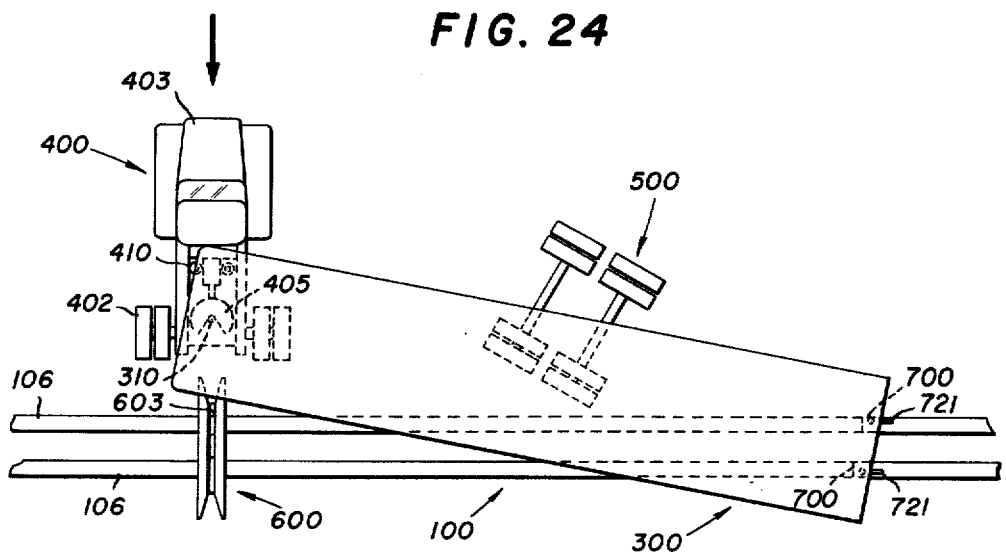

The tractor 400 is then turned sharply moving the kingpin 310 on the freight container 300 toward the bolster 600 as is diagrammatically illustrated in FIG. 24 of the drawings, this movement of the tractor 400 serving to cause the front end of the freight container 300 to swing in an arc about the connected dollies 700 at the rear end thereof and toward the top flanges 106 so as to reduce the initial acute angle between the center line of the freight container 300 and the center line of the railway car 100. The bolster 600 is then moved along the top flanges 106 to a position such that the channel 603 is located to intercept the kingpin 310, the position of the bolster 600 being adjusted by partially elevating the same to clear the plungers 609 from the holes 221 in the shock-absorbing mechanism 200 and then moving the bolster 600 to the desired location after which it again lowered upon the top flanges 106 and the plungers inserted in a laterally aligned pair of holes 221. The tractor 400 is then further backed to cause the adjacent front corner of the container base 301 to overhang the adjacent outer end of the bolster 600 and particularly the adjacent outer ends of the box-like elements 601 including particularly the slide plates 602 thereof, the parts now being in the position illustrated in FIGS. 25 and 26 of the drawings. With the front end of the freight container 300 now resting above the bolster 600, the fifth-wheel mechanism 405 is operated to release the kingpin 310 and the fifth-wheel mechanism 405 is then lowered by operating the elevating mechanism 406 so that the front end of the container 300 now rests upon and is supported by the adjacent outer end of the bolster 600. The cable 411 from the appropriate winch 410 is then threaded about a pulley 110 temporarily mounted upon the top flange 106 disposed toward the tractor 400 and the hook 412 on the cable 411 connected to the freight container 300 at the front corner thereof disposed toward the tractor 400. The winch 410 is then operated to draw the cable 411 toward the tractor 400 and about pulley 110 whereby to move the front end of the freight container 300 along the slide plates 602 of the bolster 600 until the center line of the freight container 300 is substantially coincident with the center line of the railway car 100, the freight container 300 being pivoted about the dollies 700 which are free to roll along the top flanges 106 to accommodate such movement of the freight container 300.

During the final movement of the front end of the freight container 300 along the bolster 600, the kingpin 310 which is being guided along the channel 603 engages the adjacent tapered edge 623 of the adjacent locking jaw 621, see particularly FIG. 11, whereby if the kingpin 310 is moving along the channel 603 from right to left as viewed therein, the right-hand locking jaw 621 is moved from the solid line position thereof to the dashed line position thereof against the action of the spring 627, thereby to permit the kingpin 310 to pass the right-hand locking jaw 621 and come into engagement with the holding surface 624 of the left-hand locking jaw 621; through the action of the associated spring 627, the right-hand locking jaw 621 is automatically moved to the full line position thereof upon movement of the kingpin 310 to the position illustrated diagrammatically in FIG. 11, i.e., when the center line of the freight container 300 is substantially coincident with the center line of the railway car 100.

The freight container 300 is now mounted upon the railway car 100 in a particular longitudinal position thereon for limited and cushioned longitudinal movements with respect thereof to afford the freight container 300 protection against the transfer thereto of severe longitudinal shocks from the center sill 101 of the railway car. More specifically, the kingpin 310 on the freight container 300 is firmly locked to the bolster 600 by the locking mechanism 620 to provide a substantially rigid connection therebetween; the bolster 600 is in turn connected to the shock-absorbing mechanism 200 and more specifically the plungers 609 are disposed respectively on either side of the center sill 101 and depending downwardly below the top flanges 106 and engage in the holes 221 in the rub rail 201 which is in turn mounted on the center sill 101 by means of the four resilient mountings 210. Since each of the mountings 210 affords eight inches of movement in either direction longitudinally with respect to the associated I-beam 104, the mounted freight container 300 and the attached bolster 600 are capable of having a total travel of sixteen inches of shock-absorbing movement with respect to the center sill 101, the freight container 300 being cushioned by both of the laterally aligned shock-absorbing mechanisms 200 which are interconnected by the bolster 600 to act in unison in the cushioning of the connected freight container 300.

Figure 13:
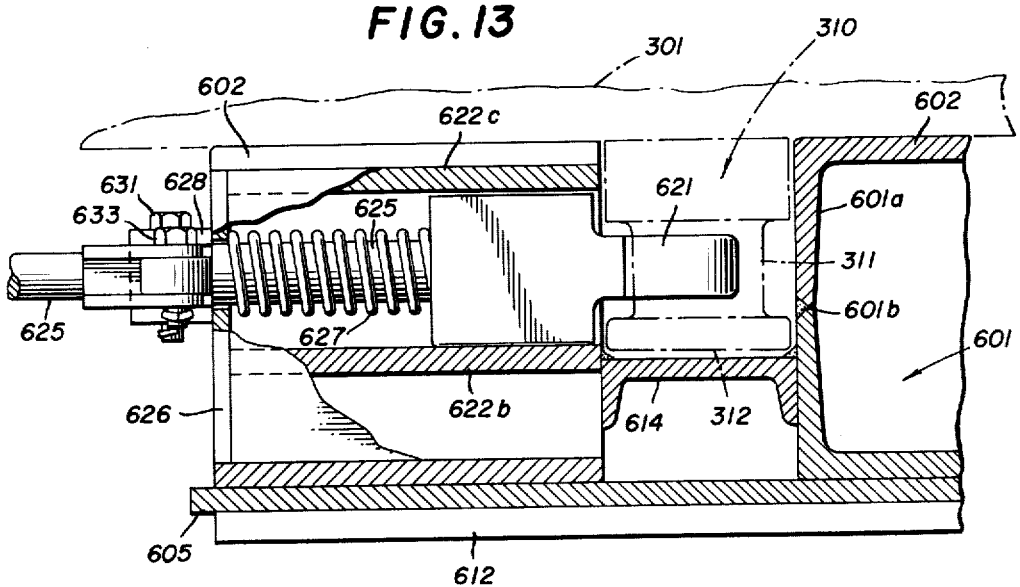
FIG. 13 is a vertical section of the bolster along the line 13—13 of FIG. 12.

The locking jaws 621 in addition to preventing lateral displacement between the freight container 300 and the bolster 600 in the locking position thereof, also prevent a vertical separation therebetween in that the locking jaws engage the kingpin 310 in the neck thereof provided by the reduced portion 311, see FIG. 13, whereby the head 312 contacts and is restrained by the locking jaw 621 in the event that the freight container 300 tends to move upwardly away from the bolster 600. The bolster 600 also limits the vertical movement of the connected freight container 300 with respect to the associated center sill 101 by means of the pairs of bolts 615 mounted on each of the parts 607, the bolts 615 underlying closely the associated top flange 106, see FIG. 17, without interfering with the shock-absorbing longitudinal sliding movement of the bolster 600 upon the top flange 106 which is facilitated by the sill skids 606.

While the front end of the freight container 300 is mounted for shock-absorbing sliding movement upon the top of the associated center sill 101, the rear end of the freight container 300 is mounted for rolling movement upon the top of the associated center sill 101 by means of the pair of dollies 700, the dolly frames 701 supporting the adjacent rear corner of the container frame 301 and being in turn rollingly supported by the pairs of rollers 706 and 708 upon the top flanges 106. Lateral movement of the freight container frame 301 with respect to the dollies 700 is limited by the presence of the pins 711 in the associated cone hole 305; lateral movement of the dollies 700 with respect to the associated top flanges 106 is in turn limited by the keepers 727 and the bumpers 729, see FIGS. 20 and 22. Vertical separation between the freight container base 301 and the dollies 700 is limited by the hooks 713 engaging the associated annular flange 306, see FIG. 19, and vertical movement of the dollies 700 with respect to the associated top flange 106 is in turn limited by the flanges 728 on the keepers 727 engaging beneath the underside of the associated top flanges 106. It is possible to lock the handles 720 controlling the hooks 713 in the engaging position thereof by moving the locking pins 725 outwardly to the dashed line position illustrated in FIG. 18 when the handles 720 are in the position illustrated by full lines in FIG. 19.

Considering now the present inventive method of unloading the freight container 300 from the associated railway car 100, and specifically from the side thereof, and from its rail traveling position supported upon the bolster 600 and the dollies 700 on the railway car 100 to the road-traveling position thereof upon the tractor 400 and the bogie 500, the above described loading steps are essentially reversed. Referring to FIGS. 24 and 27, the tractor 400 is backed toward the front end of the freight container 300 and placed essentially in the position illustrated in FIG. 27, the fifth-wheel mechanism 405 being elevated so that it is in general horizontal alignment with the upper surface of the bolster 600; the kingpin 310 is released from the locking mechanism 320 by operating the handle for the locking jaw 621 disposed toward the tractor 400, such, as for example, by retracting the right hand jaw 621 as viewed in FIG. 11 by moving the handle 634 from the full line position thereof to the dashed line position thereof; the bogie 500 is placed essentially in the position illustrated in FIG. 24 of the drawings with the frame 505 thereon in the lowered position and with the latch members 504 in the retracted position; a length of the cable 411 is withdrawn from the winch 410 disposed forwardly with respect to the center line of the freight container 300 and the attached hook is connected to the front corner of the freight container 300 disposed away from the tractor 400. The winch 410 is then operated to move the front end of the freight container 300 across the slide plates 602 of the bolster 600 to disengage the kingpin 310 from the locking mechanism 620 and the front end of the freight container 300 is moved into the fifth-wheel mechanism 405 of the tractor 400, the fifth-wheel mechanism 405 having been actuated to an elevated position as described above, so that the upper surface thereof is in general horizontal alignment with the upper surface of the slide plates 602, the final movement of the freight container 300 into the fifth-wheel mechanism 405 serving automatically to cause engagement of the kingpin 310 with the fifth-wheel mechanism 405. The bogie 500 is positioned as generally illustrated in FIG. 24 of the drawings so that the frame thereof will be ready to receive the base 301 of the freight container 300 upon movement of the tractor 400 and the freight container 300 to the position illustrated in FIG. 23, it being understood that in many instances it will be desirable to position the bogie 500 by means of the tractor 400 before the connection of the tractor 400 to the front end of the freight container 300 as explained above. The tractor is then turned sharply to the left as viewed in FIG. 24 and driven to the position illustrated in FIG. 23 wherein the base 301 of the freight container 300 is positioned generally over the frame 501 of the bogie 500, this movement of the freight container 300 with respect to the railway car 100 being facilitated by the independent rolling movement of the dollies 700 along the top flanges 106, whereby the center line of the freight container 300 is again disposed at an acute angle of about 30° to 45° with respect to the longitudinal center line of the railway car 100. The controls 503 on the bogie 500 are then operated to raise the frame 505 thereof (see FIGS. 5 and 6) to an elevated position engaging the underside of the base 301 of the freight container 300; the latch members 504 are then moved inwardly to engage the flanges 304 thereby to interconnect the bogie frame 505 and the freight container base 301.

The controls 503 are then further operated further to elevate the frame 505 and thereby to lift the container 300 until the rear end of the base 301 has been raised to a height sufficient so that the cone holes 305 are disposed upon the pins 711 on the dollies 700. The tractor 400 with the attached freight container 300 and bogie 500 is then moved to a position such that all portions of the freight container 300 are clear of the railway car 100 and at this time the elevating mechanism 406 and the elevating mechanism 506 are operated so as to lower the fifth-wheel mechanism 405 and the frame 505 from the upper loading and unloading position thereof to the lower road-traveling position thereof, thereby to complete the transfer of the freight container 300 from the rail-traveling position thereof on the railway car 100 upon the bolster 600 and the dollies 700 to the road-traveling position thereof on the tractor 400 and the bogie 500, the entire unloading operation having been achieved from the side of the railway car 100 and intermediate the ends thereof.

Referring to FIGS. 2 and 28 to 30, of the drawings, it will be seen that the railway car 100 has a length such that it normally carries two of the freight containers 300. An important feature of the present invention resides in the fact that the order of loading the freight containers 300 upon the railway car 100 and the arrangement thereof on the railway car 100 is immaterial due to the fact that each of the freight containers 300 is loaded independently from the side of the railway car 100 without access to either end thereof and utilizing only that portion of the railway car 100 which is to underlie and support the freight container 300 thereon. As seen in FIG. 28 of the drawings, the two bolsters 600A and 600B carried by the railway car 100 may be arranged so that the two front ends of the respective freight containers 300A and 300B are disposed adjacent to each other with the rear ends of the freight containers 300A and 300B being supported by pairs of dollies 700A and 700B respectively disposed at the ends of the railway car 100. From FIG. 28 it will be seen that each of the freight containers 300A and 300B can be loaded independently of the other and in any order desired; more specifically, in loading the freight container 300A, for example, the center line 320A of the freight container 300A is arranged at an initial acute angle with respect to the center line of the railway car 100 between a line 321A disposed at an angle of 45° with respect to the center line of the railway car 100 and a line 322A disposed at an angle of 30° with respect to the center line of the railway car 100. After placing the rear end of the freight container 300A upon the dollies 700A, the kingpin 310A is moved by the associated tractor along an arc 323A until the kingpin 310A is supported upon and grasped by the bolster 600A. Such movement of the freight container 300A and the associated parts can be effectively carried out even after the freight container 300B is in its mounted position upon the railway car 100; conversely, the freight container 300B can likewise be mounted upon the other end of the railway car 100 after the freight container 300A has been placed in its mounted position thereon.

There is illustrated in FIG. 29 an arrangement of the parts wherein the two bolsters 600A and 600B carried by the railway car 100 are arranged so that the two rear ends of the containers 300A and 300B supported upon the associated pairs of dollies 700A and 700B are disposed adjacent to each other at the longitudinal center of the railway car 100, the bolsters 600A and 600B being arranged adjacent to the respective ends of the railway car 100.

In still another arrangement of the parts, illustrated in FIG. 30, the two bolsters 600A and 600B carried by the railway car 100 are arranged so that the two containers 300A and 300B are arranged in tandem relation with respect to each other, the rear end of the container 300A being arranged adjacent to the front end of the freight container 300B.

Referring to FIGS. 31 to 35 of the drawings there is shown another embodiment of the freight transportation system in which the methods of the present invention may be carried out, this system comprising a railway car 100C that is adapted to support and transport freight containers, the freight container illustrated in FIGS. 31 and 33 being in the form of a road semi-trailer 300C essentially comprising a base 301C provided with a rear end carrying road wheels 321C and a front end carrying both a kingpin 310C and a front landing gear 323C, as well as a body 302C adapted to receive lading which is to be transported. Accordingly it will be understood that the road semi-trailer 300C is entirely conventional and includes no equipment whatsoever particularly adapting the same for transportation upon the railway car 100C.

The railway car 100C essentially comprises a longitudinally extending center sill 101C of "fish-belly" construction supported at the opposite ends thereof by a pair of trucks 102C of standard rail gauge, which cooperate with an associated railway track 103C, also of standard rail gauge. The center sill 101C essentially comprises a pair of longitudinally extending laterally spaced-apart I-beams 104C which are suitably connected together at a plurality of longitudinally spaced-apart points by a corresponding plurality of cross braces. The top flanges 106C of the I-beams constitute a pair of longitudinally extending and laterally spaced-apart rails provided on the top of the center sill 101C and constitute a trackway of given narrow gauge. Also the railway car 100C comprises a pair of longitudinally extending and laterally spaced-apart platforms 107C respectively carried by the outer sides of the webs of the I-beams 104C and respectively projecting outwardly therefrom and disposed below the top flanges 106C and constituting a roadway of standard road gauge. Each of the platforms 107C is supported by a plurality of longitudinally spaced-apart and laterally outwardly projecting cantilever beams 108C disposed therebelow in supporting relation therewith (see FIG. 33), the inner ends of the beams 108C being rigidly secured, as by welding, to the outer sides of the webs of the adjacent I-beams 104C.

The railway car 100C is further provided with shock-absorbing mechanisms 200C disposed on each side of the center sill 101C and disposed laterally outwardly with respect thereto and mounted on the longitudinally extending web of the adjacent I-beam 104C by means of resilient mountings 210C, four of the resilient mountings 210C being utilized in mounting each of the rub rails 201C. Each of the resilient mountings 210C includes a resilient elastomeric or live rubber pad or block 211C having the inner face thereof intimately bonded to an inner mounting plate 212C and the outer surface thereof intimately bonded to an outer mounting plate 214C, the inner mounting plate 212C being fixedly secured as by rivets to the adjacent I-beam 104C and the outer mounting plate 214C being fixedly secured to the rub rail 201C as by rivets. The upper portion of the rub rail 201C includes an attachment plate 220C having spaced-apart rectangular holes 221C therein throughout the length thereof. It will be noted that the two rub rails 201C disposed on opposite sides of the center sill 101 are disposed below the adjacent top flange 106C carried on the top of the associated I-beam 104C and above the top of the associated platform 107C. Also, each of the rub rails 201C is disposed laterally outwardly of the adjacent top flange 106C and laterally inwardly of the inner edge of the associated platform 107C and presents a smooth outwardly facing rubbing surface to the adjacent inner surface of the inner road wheel 321C carried by the semi-trailer 300C, which arrangement protects the inner road wheels 321C when positioned upon the associated railway car 100C, the rub rails 201C not only providing a smooth facing surface but also being resiliently mounted in a lateral direction by the rubber pads 211C.

The railway car 100C also carries adjacent to one end thereof a semi-trailer hitch 800 which is of the fundamental construction and arrangement of that disclosed and claimed in the copending application of Deodat Clejan, Serial No. 861,291, filed December 22, 1959. The hitch 800 essentially comprises a laterally extending trunnion 801 supported on the opposite ends thereof in the webs of the laterally spaced-apart I-beams 104C of the center sill 101C, a standard 802 and a strut 803; which hitch is operative between a storage position illustrated in FIG. 32, wherein it is disposed within the hollow center sill 101C and below the top thereof, and an erected position as shown in FIG. 31, wherein it is disposed out of the hollow center sill 101C and well above the top thereof. More specifically, the trunnion 801 is pivotally mounted about a fixed axis upon the center sill 101C and has fixedly attached thereto the lower end standard 802 so that the standard 802 pivots about the axis of the trunnion 801; and one end of the strut 803 is pivotally connected to the standard 802 intermediate the ends thereof by a pivot pin 804 and the other end of the strut 803 is mounted upon a shaft 805 so that the strut 803 pivots about the axis of the shaft 805. The shaft 805 is shiftable longitudinally along the center sill 101C and is rigidly connected to a tubular member 806 extending laterally between the I-beams 104C and having the ends thereof supported respectively by a pair of slides 807 disposed respectively in a pair of associated trackways 808 mounted on the inner facing sides of the webs of the I-beams 104C, whereby the lower end of the strut 803 is mounted for longitudinal sliding movement within the center sill 101C and guided thereon by means of the trackways 808 and the associated slides 807, the strut 803 pivoting about the axis of the shaft 805 when the slides 807 move along the trackways 808.

The upper end of the standard 802 carries a fifth-wheel mechanism 810 which is pivotally mounted thereon as at 811 and carries mechanism for releasably engaging the kingpin 310C on the sim-trailer 300C, the fifth-wheel mechanism also including the release actuator 812 mounted on the standard 802. When the actuator 812 is moved to the right as viewed in FIG. 31, it serves to release the locking jaws gripping the kingpin 310C and locking it to the fifth-wheel mechanism 810, the release actuator 812 being automatically operable upon contact with an abutment on the associated tractor so as automatically to cause release of the kingpin 310C when the tractor is moved into position to receive the front end of the semi-trailer 300C from the fifth-wheel mechanism 810 in a flying transfer of the kingpin 310C from the fifth-wheel mechanism 810 to the fifth-wheel mechanism of the tractor, as will be explained more fully hereinafter.

When the semi-trailer hitch 800 is in the erected position, illustrated in FIG. 31, it is desirable that the lower end of the strut 803 connected to the shaft 805 be also connected to the shock-absorbing mechanism 200C and to this end there has been provided a cross bar 230C which is mounted for sliding horizontal movement longitudinally of the center sill 101C, and more particularly, the cross bar 230C extends through elongated slots 111C formed in each of the I-beams 104C. The outermost ends of the cross bar 230C extend through and outwardly beyond the associated I-beam 104C and underneath the associated rub rails 201C and terminating inwardly with respect to the outer sides thereof. Interconnection is made between the associated rub rails 201C and the cross bar 230C by means of opposed pairs of abutments 231C fixedly secured to the bottom flange 203C of the associated rub rails 201C, the abutments 231C on each of the rub rails 201C being disposed on opposite sides of the associated end of the cross bar 230C and being fixedly secured thereto as by welding, whereby movement of the cross bar 230C longitudinally of the center sill 101C is restricted and cushioned by the shock-absorbing mechanism 200C, and more specifically, by the action of the rubber pads 211C resisting the movement of the rub rails 201C longitudinally of the center sill 101C. Disposed adjacent to each end of the slots 111C and mounted on the inner surface of the web of the associated I-beam 104C are pairs of mountings 112C containing and holding bumpers 113C disposed in lateral alignment with the ends of the associated slot 111C to limit the longitudinal movement of the cross bar 230C along the slots 111C and to cushion the cross bar 230C at the extreme limits of the path of travel thereof, see FIG. 34. The center line of the cross bar 230C in the full line representation thereof can move eight inches in each direction to the left and to the right to the dashed line representations thereof respectively, whereby to afford a total cushioned travel of sixteen inches of the cross bar 230C longitudinally of the I-beams 104C, the limits of travel of the cross bar 230C being also set and cushioned by the rubber blocks 113C described above.

Connection between the lower end of the strut 803 and the shock-absorbing mechanism 200C is effected by means of a latch structure generally designated by the numeral 820 and including a laterally spaced-apart pair of latch elements 821 mounted for pivotal movement about the axis of the shaft 805. In the retracted condition of the semi-trailer hitch 800 illustrated by full lines in FIG. 32, the latch elements 821 are spaced from the cross bar 230C and are not in engagement therewith; but upon movement of the shaft 805 and the attached latch elements 821 to the left, as viewed in FIG. 32, an inclined cam surface 824 on the nose of each of the latch elements 821 engages the adjacent side of the cross bar 230C to pivot the latch elements 821 in a clockwise direction so that they ride over the cross bar 230C after which the latch elements 821 rotate under the urging of gravity in a counterclockwise direction so that the cross bar 230C is received within notches 825 formed in the lower surfaces of each of the latch elements 821, thereby to interconnect the lower end of the strut 823 through the shaft 805 and the latch elements 821 to the shock-absorbing mechanism 200C and particularly the cross bar 230C thereof. It will be understood therefore that movement of the parts of the semi-trailer hitch 800 from the retracted position illustrated in FIG. 32 to the elevated support position illustrated in FIG. 31 automatically connects the lower end of the strut 803 to the shock-absorbing mechanism 200C. The shock-absorbing mechanism 200C acting through the strut 803 and the standard 802 and the fifth-wheel mechanism 810 serves to cushion the semi-trailer 300C against longitudinal shocks from the railway car 100C whereby the semi-trailer 300C is mounted for rolling and shock-absorbed support upon the railway car 100C.

In order to move the semi-trailer hitch 800 from the erected support position illustrated in FIG. 31 to the lower retracted postion illustrated in FIG. 32, it is necessary to disconnect the latch structure 820 from the shock-absorbing mechanism 200C and, more specifically, to disengage the latch elements 821 from the cross bar 230C. To this end there has been provided a linkage 822 mounted upon the standard 802 and the strut 803 and provided with a latch actuator 823 also mounted upon the standard 802 operable upon movement thereof to the right in FIG. 31 to move the latch elements 821 in a clockwise direction sufficiently to clear the cross bar 230C. The latch actuator 823 is so positioned that it cooperates with an abutment upon the associated tractor whereby the latch actuator 823 is automatically operated to release the latch elements 821 from the cross bar 230C upon movement of the tractor rearwardly to a position such that the fifth-wheel mechanism of the tractor is in position to receive the kingpin 310C of the semi-trailer 300C from the fifth-wheel mechanism 810.

The above described construction of the semi-trailer hitch 800 and its connection to the shock-absorbing mechanism 200C facilitates a flying transfer of the kingpn 310C of the semi-trailer 300C between the fifth-wheel mechanism of the associated tractor and the fifth-wheel mechanism 810 during the loading and the unloading of the semi-trailer 300C with respect to the railway car 100C. Considering first the present inventive method of loading the trailer 300C onto the top of the railway car 100C, and assuming that the hitch 800 is in the storage position illustrated in FIG. 32, the semi-trailer 300C and the associated tractor are moved rearwardly, or to the right in FIGS. 31 and 32, onto the platforms 107C during which movement the rub rails 201C serve to center and properly position the various wheels upon the platforms 107C, the kingpin 310C being disposed to the right of the trunnion 801 as viewed in FIG. 31. A hook (not shown) carried by the associated tractor is connected to the standard 802 of the hitch 800 and the tractor and the coupled semi-trailer 300C are moved forwardly, or to the left in FIGS. 31 and 32, so that the tractor acting through the connecting hook raises the hitch 800 from the storage position of FIG. 32 toward the erected position of FIG. 31; and when the fifth-wheel mechanism 810 is near the supporting position thereof behind the fifth-wheel mechanism on the tractor, the fifth-wheel mechanism on the tractor is actuated to uncouple the kingpin 310C therefrom while the associated tractor is driven further forwardly pivoting further the standard 802 into its normal supporting attitude. The tractor is then driven still further forwardly so as to pivot the standard 802 into its full supporting attitude so that the fifth-wheel mechanism 810 engages and grips the kingpin 310C and the latch structure 820 automatically engages the shock-absorbing mechanism 200C. The hook interconnecting the tractor and the hitch 800 is then disengaged and the tractor is completely disconnected from the semi-trailer 300C and from the hitch 800 and may then be driven forwardly from the railway car 100C. In view of the foregoing, it will be understood that a flying transfer is made of the support of the front end of the semi-trailer 300C from the fifth-wheel mechanism carried by the rear end of the associated tractor to the fifth-wheel mechanism 810 carried by the upper end of the standard 802 of the hitch 800 carried by the railway car 100C, with a continuous forward movement of the tractor along the top of the railway car 100C.

As previously explained, during the operation of the railway car 100C, the semi-trailer 300C mounted upon the top thereof is capable of limited longitudinal rolling movements therealong; which longitudinal movements of the semi-trailer 300C and the connecting fifth-wheel mechanism 810 take places together, and as a unit, imparting corresponding fore-and-aft movements to the hitch 800 and the consequent transmission of such fore-and-aft movements to the shock-absorbing mechanism 200C; whereby the shock-absorbing mechanism 200C absorbs the severe longitudinal shocks effecting cushioned and limited longitudinal movements of the semi-trailer 300C in its mounted position upon the top of the railway car 100C.

Considering now the present inventive method of unloading the trailer 300C from its mounted position on the top of the railway car 100C and again referring to FIGS. 31 and 32, the associated tractor is backed onto the left-hand end of the railway car 100C until the rear end thereof is located immediately forward with respect to the hitch 800 supporting the front end of the semi-trailer 300C. Upon further rearward movement of the tractor, the fifth-wheel mechanism thereof is moved below the front end of the semi-trailer 300C and then the abutments thereof sequentially engage first the fifth-wheel release actuator 812 to release the kingpin 310C from the fifth-wheel mechanism 810 and then engage secondly the latch actuator 823 to disconnect the latch structure 820 from the shock-absorbing mechanism 200C. The impact of the abutments carried on the tractor with the actuators 812 and 823 effect rotation of the standard 802 in a clockwise direction with respect to the axis of the trunnion 801, whereby the hitch 800 is moved from its erected position of FIG. 31 back into its storage position of FIG. 32 fundamentally by the action of gravity. In the movement of the hitch 800 out of its erected position, the fifth-wheel mechanism 810 disengages the kingpin 310C and immediately thereafter the fifth-wheel mechanism on the tractor engages and supports the front end of the semi-trailer 300C and automatically grips and locks the kingpin 310C thereof; whereby the tractor may then be driven forwardly off of the left-hand end of the railway car 100C drawing the coupled semi-trailer 300C along therewith, so as to complete the unloading operation. In view of the foregoing, it will be understood that the rearward movement of the tractor along the top of the railway car 100C in the unloading operation described above is continuous; whereby the flying transfer is made of the support of the front end of the semi-trailer 300C from the fifth-wheel mechanism 810 carried by the hitch 800 to the fifth-wheel mechanism carried by the rear end of the associated tractor; and simultaneously, the hitch 800 is moved from its erected position of FIG. 31 back into its storage position of FIG. 32.

Referring now to FIG. 36, a modified or supplemental manner of connecting the semi-trailer 300C to the shock-absorbing mechanism 200C has been illustrated, wherein the rear end of the semi-trailer 300C and particularly the axle housing 322C thereof are connected to the shock-absorbing mechanism 200C. Each end of the axle housing 322C has associated therewith an attachment 900 including a flexible cable 901 carrying centrally thereof a curved bearing plate 902 adapted to fit over the associated end of the axle housing 322C and carrying on each end thereof a suitable connecting member such as a hook 903 engageable in the holes 221C of the associated rub rail 201C. The cables 901 when connected as illustrated in FIG. 36 provide an interconnection between the rear end of the associated semi-trailer and particularly the rear axle housing 322C thereof and the shock-absorbing mechanism 200C disposed therebeneath, the cables 901 serving as a tie-down arrangement and also serving to prevent transmittal of longitudinal shocks from the I-beams 104C to the axle housing 322C and the connected semi-trailer 300C.

In a constructional example of the railway car 100: the flanged wheels carried by the trucks 102 and cooperating with the track rails 103 are of standard rail gauge; the longitudinal distance between the striker plates carried at the opposite ends of the center sill 101 is 85 ft. 8 in.; the lateral distance between the outside edges of the top flanges 106 of the I-beams 104 incorporated in the center sill 101 is 3 ft. 3⅛ in.±¼ in.; the lateral distance between the inside edges of the top flanges 106 of the I-beams 104 incorporated in the center sill 101 is 1 ft. 5¹⁵⁄₁₆ in.±¼ in.; and the other dimensions involved are generally related to these related above in accordance with the scales of the various figures of the drawings. The corresponding parts of the railway car 100C have dimensions corresponding to like parts of the railway car 100; and in addition the vertical distance between the top of the road platform 107C carried by the center sill 101C and the top of the track rails 103C is 3 ft. ½ in.; the vertical distance between the top of the top flanges 106C of the I-beams 104C incorporated in the center sill 101C and the top of the road platforms 107C is 8 in.; the lateral distance between the outer edges of the road platforms 107C is 8 ft. 4 in.; and the other dimensions involved in the railway car 100C are generally related to those mentioned above in accordance with the scales of the various figures of the drawings. Furthermore, the freight container 300 has a length of approximately 40 ft. from the front end to the rear end thereof and the semi-trailer 300C likewise has a length of about 40 ft. from the front end to the rear end thereof.

The construction and arrangement of the railway car 100, and of the combination of the railway car 100, the container 300, the container bolster 600, the container dollies 700, and the other elements of the freight transportation system, are disclosed and claimed in the copending application of Deodat Clejan, Serial No. 226,429, filed September 26, 1962; which last-mentioned application comprises a continuation-in-part of the present application.

In view of the foregoing, it is apparent that there has been provided an improved method of loading and method of unloading freight containers in a freight transportation system involving a railway car, the freight containers each having a base divided with a kingpin at the front end thereof and cone holes at the rear end thereof, tractors and bogies, bolsters and pairs of dollies adapted to be mounted upon the railway car, and road semi-trailers; wherein the railway car incorporates therein a shock-absorbing mechanism operably associated with the bolster, as well as a semi-trailer hitch also operably associated with the shock-absorbing mechanism. Also the railway car is of the universal type in that it is capable of transporting indiscriminately freight containers or road semi-trailers, while affording shock-absorption protection to the transporated freight container or road semi-trailer during the transportation thereof. Further, the railway car embodies a rub rail guiding arrangement accommodating ready loading of the road semi-trailers thereupon without damage to the rubber of the wheels of the road semi-trailers.

While there have been described what are at present considered to be certain preferred embodiments of the invention, it will be understood that various modifications may be made therein, and it is intended to cover in the appended claims all such modifications as fall within the true spirit and scope of the invention.

What is claimed is:

1. The loading methods involved in a freight transportation system comprising a railway car including an elongated longitudinally extending frame supported at the opposite ends thereof by a pair of trucks, a pair of elongated longitudinally extending and laterally spaced-apart rails carried by the top of said frame and defining an elongated longitudinally extending track thereon, a freight container including an elongated base provided with a front end carrying a substantially centrally disposed kingpin, a bogie including a body provided with road wheels and facility for selectively connecting and disconnecting said body with respect to the rear end of the base of said container so as to produce therewith a composite road semi-trailer, a pair of dollies selectively connectible and disconnectible with respect to laterally spaced-apart rear end portions of the base of said container rearwardly of said connected bogie, the connected body of said dollies being provided with rollers that are adapted to engage the respective rails of said track for longitudinal movements therealong, a laterally extending container bolster mounted upon said track for longitudinal movements therealong and arranged to support the front end of the base of said container and provided with facility adapted selectively to couple and to uncouple said kingpin, and a tractor including a chassis carrying road wheels and also a fifth-wheel mechanism at the rear end thereof, said fifth-wheel mechanism being adapted to support the front end of the base of said container and provided with facility adapted selectively to couple and to uncouple said kingpin; said method involving loading said container upon the top of said railway car when the front end of the base of said container is supported by said fifth-wheel mechanism with the same coupled to said kingpin and when the rear end of the base of said container is supported by the connected body of said bogie; said method comprising backing said tractor to cause said container and said connected bogie to move rearwardly along a given center line disposed at a predetermined acute angle to the center line of said frame and into a position wherein the rear end of the base of said container overhangs the rails of said track, arranging said dollies in their supported positions upon the respective rails of said track so that they are disposed below respectively adjacent rear end portions of the base of said container, connecting said dollies to the respectively adjacent rear end portions of the base of said container and disconnecting the body of said bogie from the rear end of the base of said container so as to transfer the support of the rear end of the base of said container to said dollies engaging the respective rails of said track, then backing said tractor to cause the front end of said container to swing in an arc about said connected dollies toward said frame so as to reduce said given acute angle between the center line of said container and the center line of said frame, arranging said bolster in its supported position upon said track in intersecting relation with the arc of movement of said kingpin, then backing said tractor to cause the adjacent front corner of the base of said container to overhang the adjacent outer end of said bolster, uncoupling said fifth-wheel mechanism from said kingpin and transferring the support of the front end of the base of said container to said bolster, and then moving the front end of the base of said container into a centered position on said supporting bolster mounted upon said track so as to cause said bolster to couple said kingpin and wherein the center line of said container is substantially coincident with the center line of said frame.

2. The loading method set forth in claim 1, wherein said given acute angle between said predetermined center line and the center line of said frame is in the general range 30° to 45° and the approach of said container toward said frame is from either end of said frame.

3. The loading method involved in a freight transportation system comprising a railway car including an elongated longitudinally extending frame supported at the opposite ends thereof by a pair of trucks, a pair of elongated longitudinally extending and laterally spaced-apart rails carried by the top of said frame and defining an elongated longitudinally extending track thereon, a freight container including an elongated base provided with a front end carrying a substantially centrally disposed kingpin, a bogie including a body provided with road wheels and first facility for selectively elevating and lowering said body with respect to said road wheels and second facility for selectively connecting and disconnecting said body with respect to the rear end of the base of said container so as to produce therewith a composite road semi-trailer, whereby the body of said bogie has a relatively low road-traveling position and a relatively high transfer position, a pair of dollies selectively connectible and disconnectible with respect to laterally spaced-apart rear end portions of the base of said container rearwardly of the connected body of said bogie, said connected dollies being provided with rollers that are adapted to engage the respective rails of said track for longitudinal movements therealong, a laterally extending container bolster mounted upon said track for longitudinal movements therealong and arranged to support the front end of the base of said container and provided with facility adapted selectively to couple and to uncouple said kingpin, and a tractor including a chassis carrying road wheels and also a fifth-wheel mechanism at the rear end thereof and provided with facility for selectively elevating and lowering said fifth-wheel mechanism with respect to said road wheels, whereby said fifth-wheel mechanism has a relatively low road-traveling position and a relatively high transfer position, said fifth-wheel mechanism being adapted to support the front end of the base of said container and provided with facility adapted selectively to couple and to uncouple said kingpin; said method involving loading said container upon the top of said railway car when the front end of the base of said container is supported by said fifth-wheel mechanism with the same coupled to said kingpin and when the rear end of the base of said container is supported by the said body of said bogie; said method comprising operating said tractor to elevate said fifth-wheel mechanism into its transfer position and operating said bogie to elevate the body thereof into its transfer position, backing said tractor to cause said container and the connected body of said bogie to move rearwardly along a given center line disposed at a predetermined acute angle to the center line of said frame and into a position wherein the rear end of the base of said container overhangs the rails of said track, arranging said dollies in their supported positions upon the respective rails of said track so that they are disposed below respectively adjacent rear end portions of the base of said container, operating said bogie to move the body thereof into its road-traveling position and connecting said dollies to the respectively adjacent rear end portions of the base of said container and disconnecting the body of said bogie from the rear end of the base of said container so as to transfer the support of the rear end of the base of said container to said dollies engaging the respective rails of said track, then backing said tractor to cause the front end of said container to swing in an arc about said connected dollies toward said frame so as to reduce said given acute angle between the center line of said container and the center line of said frame, arranging said bolster in its supported position upon said track in intersecting relation with the arc of movement of said kingpin, then backing said tractor to cause the adjacent front corner of the base of said container to overhang the adjacent outer end of said bolster, operating said tractor to lower said fifth-wheel mechanism into its road-traveling position and uncoupling said fifth-wheel mechanism from said kingpin so as to transfer the support of the front end of the base of said container to said bolster, and then moving the front end of the base of said container into a centered position on said supporting bolster mounted upon said track so as to cause said bolster to couple said kingpin and wherein the center line of said container is substantially coincident with the center line of said frame.

4. The unloading method involved in a freight transportation system comprising a railway car including an elongated longitudinally extending frame supported at the opposite ends thereof by a pair of trucks, a pair of elongated longitudinally extending and laterally spaced-apart rails carried by the top of said frame and defining an elongated longitudinally extending track thereon, a freight container including an elongated base provided with a front end carrying a substantially centrally disposed kingpin, a bogie including a body provided with road wheels and facility for selectively connecting and disconnecting said body with respect to the rear end of the base of said container so as to produce therewith a composite road semi-trailer, a pair of dollies selectively connectible and disconnectible with respect to laterally spaced-apart rear end portions of the base of said container rearwardly of the connected body of said bogie, said connected dollies being provided with rollers that are adapted to engage the respective rails of said track for longitudinal movements therealong, a laterally extending container bolster mounted upon said track for longitudinal movements therealong and arranged to support the front end of the base of said container and provided with facility adapted selectively to couple and to uncouple said kingpin, and a tractor including a chassis carrying road wheels and also a fifth-wheel mechanism at the rear end thereof, said fifth-wheel mechanism being adapted to support the front end of the base of said container and provided with facility adapted selectively to couple and to uncouple said kingpin; said method involving unloading said container from the top of said railway car wherein the center line of said container is substantially coincident with the center line of said frame and when the front end of the base of said container is supported by said bolster with the same coupled to said kingpin and mounted upon said track and when the rear end of the base of said container is jointly supported by said dollies respectively connected to laterally spaced-apart rear end portions of the base thereof and engaging the respective rails of said track; said method comprising backing said tractor to locate said fifth-wheel mechanism into a position adjacent to one end of said bolster, uncoupling said bolster from said kingpin, moving the front end of said container to swing it in an arc about said connected dollies engaging the respective rails of said track and onto said fifth-wheel mechanism so as to transfer the support of the front end of the base of said container to said fifth-wheel mechanism and to cause the same to couple said kingpin, driving said tractor forwardly so as to cause the front end of said container further to swing in an arc about said connected dollies engaging the respective rails of said track and into a position wherein said container and said connected tractor are positioned along a given center line disposed at a predetermined acute angle to the center line of said frame, connecting the body of said bogie to the rear end of the base of said container and forwardly of said connected dollies and disconnecting said dollies from the laterally spaced-apart rear end portions of the base of said container so as to transfer the support of the rear end of the base of said container to said bogie, and driving said tractor further forwardly so as to cause said container and the connected body of said bogie to move forwardly along said given center line and until the rear end of the base of said container is clear of the rails of said track.

5. The unloading method set forth in claim 4, wherein said predetermined acute angle between said given center line and the center line of said frame is in the general range 30° to 45° and the recession of said container from said frame along said given center line is away from either end of said frame.

6. The unloading method involved in a freight transportation system comprising a railway car including an elongated longitudinally extending frame supported at the opposite ends thereof by a pair of trucks, a pair of elongated longitudinally extending and laterally spaced-apart rails carried by the top of said frame and defining a longitudinally extending track thereon, a freight container including an elongated base provided with a front end carrying a substantially centrally disposed kingpin, a bogie including a body provided with road wheels and first facility for selectively elevating and lowering said body with respect to said road wheels and second facility for selectively connecting and disconnecting said body with respect to the rear end of the base of said container so as to produce therewith a composite road semi-trailer, whereby the body of said bogie has a relatively low road-traveling position and a relatively high transfer position, a pair of dollies selectively conectible and disconnectible with respect to laterally spaced-apart rear end portions of the base of said container rearwardly of said connected bogie, the connected body of said dollies being provided with rollers that are adapted to engage the respective rails of said track for longitudinal movements therealong, a laterally extending container bolster mounted upon said track for longitudinal movements therealong and arranged to support the front end of the base of said container and provided with facility adapted selectively to couple and to uncouple said kingpin, and a tractor including a chassis carrying road wheels and also a fifth-wheel mechanism at the rear end thereof and provided with facility for selectively elevating and lowering said fifth-wheel mechanism with respect to said road wheels, whereby said fifth-wheel mechanism has a relatively low road-traveling position and a relatively high transfer position, said fifth-wheel mechanism being adapted to support the front end of the base of said container and provided with facility adapted selectively to couple and to uncouple said kingpin; said method involving unloading said container from the top of said railway car wherein the center line of said container is substantially coincident with the center line of said frame and when the front end of the base of said container is supported by said bolster with the same coupled to said kingpin and mounted upon said track and when the rear end of the base of said container is jointly supported by said dollies respectively connected to laterally spaced-apart rear end portions of the base thereof and engaging the respective rails of said track; said method comprising backing said tractor to locate said fifth-wheel mechanism into a position adjacent to one end of said bolster, uncoupling said bolster from said kingpin, moving the front end of said container to swing it in an arc about said connected dollies engaging the respective rails of said track and into a position overhanging said fifth-wheel mechanism, operating said tractor to elevate said fifth-wheel mechanism into its transfer position so as to cause the support of the front end of the base of said container to be transferred to said fifth-wheel mechanism and to cause the same to couple said kingpin, driving said tractor forwardly so as to cause the front end of said container further to swing in an arc about said connected dollies engaging the respective rails of said track and into a position wherein said container and said connected tractor are positioned along a given center line disposed at a predetermined acute angle to the center line of said frame, connecting the body of said bogie to the rear end of the base of said container and forwardly of said connected dollies, disconnecting said dollies from the laterally spaced-apart rear end portions of the base of said container, operating said bogie to elevate the body thereof into its transfer position so as to cause the support of the rear end of the base of said container to be transferred to the body of said bogie, and driving said tractor further forwardly so as to cause said container and said connected bogie to move forwardly along said given center line and until the rear end of the base of said container is clear of the rails of said track.

References Cited in the file of this patent
UNITED STATES PATENTS

| | | |
|---|---|---|
| 2,873,693 | Chapman et al. | Feb. 17, 1959 |
| 2,960,043 | Clejan | Nov. 15, 1960 |
| 3,002,636 | Felburn | Oct. 3, 1961 |
| 3,028,023 | Eckersall | Apr. 3, 1962 |

UNITED STATES PATENT OFFICE
CERTIFICATE OF CORRECTION

Patent No. 3,102,646　　　　　　　　　　　　　　September 3, 1963

Deodat Clejan

It is hereby certified that error appears in the above numbered patent requiring correction and that the said Letters Patent should read as corrected below.

Column 20, lines 71 and 72, for "said connected bogie, the connected body of said" read -- the connected body of said bogie, said connected --; column 22, line 20, for "said", second occurrence, read -- connected --; column 24, line 5, after "of" third occurrence, insert -- the connected body of said bogie, --; line 6, strike out "bogie, the connected connected body of said".

Signed and sealed this 14th day of April 1964.

SEAL)
Attest:
RNEST W. SWIDER　　　　　　　　　　　　　　　　EDWARD J. BRENNER

Attesting Officer　　　　　　　　　　　　　　　　Commissioner of Patents